(12) United States Patent
Tanaka et al.

(10) Patent No.: US 10,474,292 B2
(45) Date of Patent: Nov. 12, 2019

(54) INFORMATION RECEPTION SYSTEM, RECORDING MEDIUM, AND INFORMATION INPUT METHOD

(71) Applicants: MegaChips Corporation, Osaka-shi (JP); Nitto Denko Corporation, Ibaraki-shi (JP)

(72) Inventors: Motoyasu Tanaka, Osaka (JP); Takashi Matsutani, Osaka (JP); Masayasu Yamamoto, Ibaraki (JP); Yuki Haraguchi, Osaka (JP); Hideo Sugawara, Ibaraki (JP); Ikuo Kawamoto, Ibaraki (JP); Motoki Haishi, Ibaraki (JP); Nobuyuki Kozonoi, Ibaraki (JP)

(73) Assignees: MEGACHIPS CORPORATION, Osaka (JP); NITTO DENKO CORPORATION, Ibaraki (JP)

( * ) Notice: Subject to any disclaimer, the term of this patent is extended or adjusted under 35 U.S.C. 154(b) by 191 days.

(21) Appl. No.: 15/705,465

(22) Filed: Sep. 15, 2017

(65) Prior Publication Data

US 2018/0004354 A1    Jan. 4, 2018

Related U.S. Application Data

(63) Continuation of application No. PCT/JP2016/058063, filed on Mar. 15, 2016.

(30) Foreign Application Priority Data

Mar. 17, 2015    (JP) .................................. 2015-052757
Mar. 17, 2015    (JP) .................................. 2015-052758

(51) Int. Cl.
*G06F 3/043*    (2006.01)
*G06F 3/041*    (2006.01)
(Continued)

(52) U.S. Cl.
CPC ............ *G06F 3/0418* (2013.01); *G06F 3/043* (2013.01); *G06F 3/0433* (2013.01);
(Continued)

(58) Field of Classification Search
CPC ...... G06F 3/0418; G06F 3/043; G06F 3/0433; G10H 1/0008; G10H 2210/061;
(Continued)

(56) References Cited

U.S. PATENT DOCUMENTS

2011/0018825 A1    1/2011  Kondo et al.
2011/0191680 A1    8/2011  Chae et al.
(Continued)

FOREIGN PATENT DOCUMENTS

JP    7-334185    12/1995
JP    2006-252037    9/2006
(Continued)

OTHER PUBLICATIONS

Office Action issued in Japanese Application 2015-052757 dated Mar. 12, 2019.
(Continued)

*Primary Examiner* — Insa Sadio
(74) *Attorney, Agent, or Firm* — Xsensus LLP

(57) ABSTRACT

An information reception device is provided with: operation surface which is adjusted to produce a characteristic index vibration by an object contact; a storage device stores candidate information (candidate information is related with the index vibration) which serves as a candidate of input information; a microphone which acquires observation information according to observation of the actual vibration arising in the surrounding environment; and a CPU. The CPU (selecting part) judges whether or not the index vibration exists in the observation information acquired. When the CPU judges that the index vibration exists, the CPU
(Continued)

selects the candidate information which is related with the index vibration as the input information.

22 Claims, 21 Drawing Sheets

(51) Int. Cl.
*G10H 1/00* (2006.01)
*G10H 3/14* (2006.01)

(52) U.S. Cl.
CPC ........... *G10H 1/0008* (2013.01); *G10H 3/143* (2013.01); *G10H 3/146* (2013.01); *G10H 2210/061* (2013.01); *G10H 2210/395* (2013.01); *G10H 2220/535* (2013.01); *G10H 2220/541* (2013.01); *G10H 2240/141* (2013.01)

(58) Field of Classification Search
CPC ....... G10H 2210/395; G10H 2220/535; G10H 2220/541; G10H 2240/141; G10H 3/143; G10H 3/146
See application file for complete search history.

(56) References Cited

U.S. PATENT DOCUMENTS

2013/0278526 A1* 10/2013 Zhu ....................... G06F 3/0416
345/173
2014/0136050 A1   5/2014 Lee et al.
2014/0210788 A1   7/2014 Harrison et al.
2015/0160728 A1*  6/2015 Yagi .................. H04M 1/72569
345/156
2016/0179239 A1   6/2016 Marui

FOREIGN PATENT DOCUMENTS

| | | |
|---|---|---|
| JP | 2008-54103 | 3/2008 |
| JP | 2011-28555 | 2/2011 |
| JP | 2013-519132 | 5/2013 |
| JP | 2014-94734 | 5/2014 |
| JP | 2014-532252 | 12/2014 |
| KR | 10-2013-0140963 A | 12/2013 |
| WO | WO 2015/033609 | 3/2015 |

OTHER PUBLICATIONS

Office Action issued in Japanese Application 2015-052758 dated Mar. 12, 2019.
English translation of the International Preliminary Report on Patentability and Written Opinion dated Sep. 19, 2017 in PCT/JP2016/058063.
International Search Report dated May 31, 2016 in PCT/JP2016/058063, filed on Mar. 15, 2016 (with English Translation).
Written Opinion dated May 31, 2016 in PCT/JP2016/058063, filed on Mar. 15, 2016.

\* cited by examiner

| No. | INDEX VIBRATION | | | CANDIDATE INFORMATION |
|---|---|---|---|---|
| | | SUPPLEMENTARY INFORMATION | | |
| | | POSITION | DIRECTION | DISTANCE | |
| 001 | FREQUENCY DISTRIBUTION OF INDEX VIBRATION | REGION 191 | +X | 5 | VOLUME INCREASE COMMAND 5 |
| 002 | | | +X | 10 | VOLUME INCREASE COMMAND 10 |
| 003 | | | −X | 5 | VOLUME DECREASE COMMAND 5 |
| 004 | | | −X | 10 | VOLUME DECREASE COMMAND 10 |
| 005 | | REGION 192 | +Y | — | POWERING-ON COMMAND |
| 006 | | | −Y | — | POWERING-OFF COMMAND |

| No. | INDEX VIBRATION | SUPPLEMENTARY INFORMATION DISTANCE | CANDIDATE INFORMATION |
|---|---|---|---|
| 001 | FREQUENCY DISTRIBUTION OF FIRST INDEX VIBRATION | 5 | VOLUME INCREASE COMMAND 5 |
| 002 | FREQUENCY DISTRIBUTION OF FIRST INDEX VIBRATION | 10 | VOLUME INCREASE COMMAND 10 |
| 003 | FREQUENCY DISTRIBUTION OF SECOND INDEX VIBRATION | 5 | VOLUME DECREASE COMMAND 5 |
| 004 | FREQUENCY DISTRIBUTION OF SECOND INDEX VIBRATION | 10 | VOLUME DECREASE COMMAND 10 |
| 005 | FREQUENCY DISTRIBUTION OF FIRST INDEX VIBRATION | EQUAL OR MORE THAN 20 | POWERING-ON COMMAND |
| 006 | FREQUENCY DISTRIBUTION OF SECOND INDEX VIBRATION | EQUAL OR MORE THAN 20 | POWERING-OFF COMMAND |

F I G. 14

311

| No. | INDEX VIBRATION | SUPPLEMENTARY INFORMATION DISTANCE | CANDIDATE INFORMATION |
|---|---|---|---|
| 001 | FREQUENCY DISTRIBUTION OF THIRD INDEX VIBRATION | 5 | VOLUME INCREASE COMMAND 5 |
| 002 | FREQUENCY DISTRIBUTION OF THIRD INDEX VIBRATION | 10 | VOLUME INCREASE COMMAND 10 |
| 003 | FREQUENCY DISTRIBUTION OF FOURTH INDEX VIBRATION | 5 | VOLUME DECREASE COMMAND 5 |
| 004 | FREQUENCY DISTRIBUTION OF FOURTH INDEX VIBRATION | 10 | VOLUME DECREASE COMMAND 10 |
| 005 | FREQUENCY DISTRIBUTION OF THIRD INDEX VIBRATION | EQUAL OR MORE THAN 20 | POWERING-ON COMMAND |
| 006 | FREQUENCY DISTRIBUTION OF FOURTH INDEX VIBRATION | EQUAL OR MORE THAN 20 | POWERING-OFF COMMAND |

790

| No. | PARTIAL MUSICAL SCALE | CANDIDATE INFORMATION |
|---|---|---|
| 001 | FREQUENCY DISTRIBUTION OF PARTIAL MUSICAL SCALE FOR RECOGNITION | TRANSFER COMMAND |

| No. | MUSICAL SCALE | CANDIDATE INFORMATION |
|---|---|---|
| 001 | FREQUENCY DISTRIBUTION OF FIRST MUSICAL SCALE | TRANSMITTING MAIL COMMAND |
| 002 | FREQUENCY DISTRIBUTION OF SECOND MUSICAL SCALE | LIGHTING COMMAND |

INFORMATION RECEPTION SYSTEM, RECORDING MEDIUM, AND INFORMATION INPUT METHOD

BACKGROUND OF THE INVENTION

Field of the Invention

The present invention relates to techniques for specifying the desired information of a user, using vibration which arises according to operation by the user out of a plurality of information stored.

Description of the Background Art

Conventionally, a technique which specifies the desired information of a user, using vibration which arises according to operation by the user is proposed. For example, the techniques for specifying the desired information of a user, based on the image information which captured the predetermined operations is shown in the Patent Document 1 (Japanese Unexamined Patent Application Publication No. 2006-252037). According to the technology indicated in the Patent Document 1, when the defined operation sound (vibration of air) which the user generated is detected, it is judged that predetermined operation was carried out by the user.

However, the technology described in the Patent Document 1 has the problem that the defined operation sound was used only for judging the existence of the operation by the user. That is, specification of desired information by the user chiefly needed to be performed based on the image information which captured the predetermined operation. Therefore, there is a problem that the technology described in the Patent Document 1 includes indispensably not only voice observation but also acquisition (imaging) of image information.

Moreover, since an object ("photography side" in the Patent Document 1) which the user operates is an unknown object, it is unknown what kind of operation sound occurs at the time of the user's operation. In such a case, in order to prevent the omission in detection, it is necessary to set up widely the range recognized to be defined operation sound. On the other hand, when the range to detect is set up widely, there is a problem that a noise is incorrect-detected as defined operation sound.

SUMMARY OF THE INVENTION

It is an object of the present invention to provide a technique for increasing an accuracy when judging whether or not index vibration exists in the observation information observed.

Therefore, the present invention is directed to an information reception system receiving input information according to a user's operation.

According to an aspect of the present invention, the information reception system includes an operation surface adjusted to produce a characteristic index vibration by an object contact, a storage configured to store candidate information which serves as a candidate of the input information, the candidate information is related with the index vibration, an observation sensor configured to acquire observation information according to observation of actual vibration arising in surrounding environment, and circuitry configured to judge whether or not the index vibration exists in the observation information acquired, and selects, when the circuitry judges that the index vibration exists, the candidate information is related with the index vibration as the input information.

According to another aspect of the present invention, the information reception system includes: a first operation target member on which an operation surface is formed, the operation surface adjusted to produce a characteristic first melody when the operation surface is rubbed by an object; and an information reception device. The information reception device includes: a storage configured to store first candidate information which serves as a candidate of the input information, the first candidate information is related with the first melody; an observation sensor configured to acquire observation information according to observation of sound arising in surrounding environment; and circuitry configured to: judge whether or not the first melody exists in the observation information acquired, and select, when the circuitry judges that the first melody exists, the first candidate information related with the first melody as the input information.

The present invention is also directed to a non-volatile computer-readable recording medium storing computer-readable instructions.

According to an aspect of the present invention, the non-volatile computer-readable storage medium storing computer-readable instructions that, when executed by a computer including circuitry, cause the computer to perform a method includes: storing, by the circuitry, candidate information which serves as a candidate of the input information, the candidate information is related with index vibration; acquiring, by an observation sensor, observation information according to observation of actual vibration arising in surrounding environment; judging, by the circuitry, whether or not the index vibration exists in the observation information acquired, and selecting, by the circuitry, when the circuitry judges that the index vibration exists, the candidate information related with the index vibration as the input information.

According to another aspect of the present invention, the non-volatile computer-readable storage medium storing computer-readable instructions that, when executed by a computer including circuitry, cause the computer to perform a method includes: storing, by the circuitry, first candidate information which serves as a candidate of the input information, the first candidate information is related with a first melody; acquiring, by an observation sensor, observation information according to observation of sound arising in surrounding environment; judging, by the circuitry, whether or not the first melody exists in the observation information acquired, and selecting, by the circuitry, when the circuitry judges that the first melody exists, the first candidate information related with the first melody as the input information.

In addition, the present invention is also directed to an information input method for inputting input information using an information reception system including circuitry.

According to an aspect of the present invention, the information input method includes: storing, by the circuitry, candidate information which serves as a candidate of the input information, the candidate information is related with index vibration; acquiring, by an observation sensor, observation information according to observation of actual vibration arising in surrounding environment; judging, by the circuitry, whether or not the index vibration exists in the observation information acquired, and selecting, by the circuitry, when the circuitry judges that the index vibration exists, the candidate information related with the index vibration as the input information.

According to another aspect of the present invention, the information input method includes: storing, by the circuitry, first candidate information which serves as a candidate of the input information, the first candidate information is related with a first melody; acquiring, by an observation sensor, observation information according to observation of sound arising in surrounding environment; judging, by the circuitry, whether or not the first melody exists in the observation information acquired, and selecting, by the circuitry, when the circuitry judges that the first melody exists, the first candidate information related with the first melody as the input information.

These and other objects, features, aspects and advantages of the present invention will become more apparent from the following detailed description of the present invention when taken in conjunction with the accompanying drawings.

BRIEF DESCRIPTION OF THE DRAWING

FIG. 6 shows a database in the preferred embodiment.

FIG. 11 shows the database in the other preferred embodiment.

FIG. 14 shows a database in the still other preferred embodiment.

DESCRIPTION OF THE PREFERRED EMBODIMENTS

The detailed description of preferred embodiments of the present invention is made below, referring to the accompanying drawings. It should be noted that the descriptions related with a direction or an orientation correspond to the drawings for the convenience of description unless otherwise specified, but do not limit products, merchandized products, and the scope of the invention, for example.

The present application claims priority from Japanese Application Number 2015-052757 and Japanese Application Number 2015-052758 both filed in Japan on Mar. 17, 2015, the contents of which are incorporated herein by reference.

Figure 1:
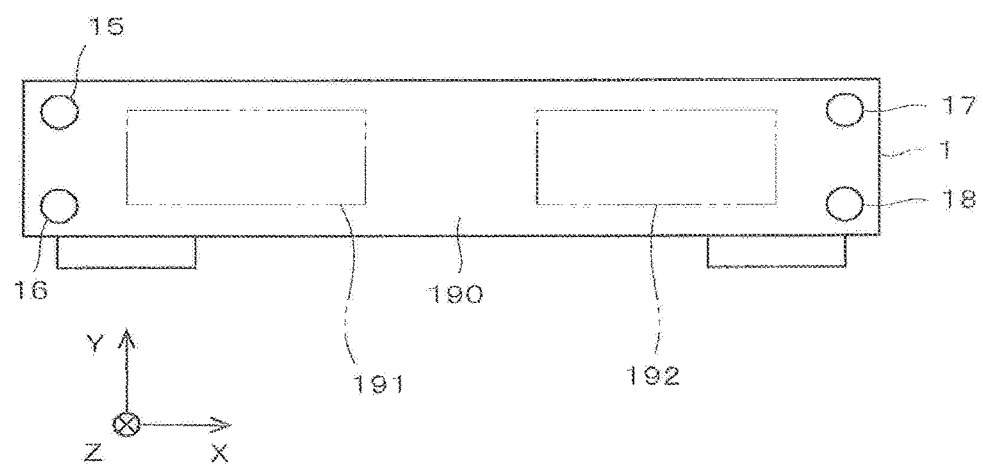
FIG. 1 shows an information reception device in a preferred embodiment.

FIG. 1 shows an information reception device 1 in a preferred embodiment. The information reception device 1 includes four microphones 15, 16, 17, and 18. The provided positions of the four microphones 15, 16, 17, and 18 in the information reception device 1 are different from each other. The surface of the housing of the information reception device 1 forms the operation surface 190.

The regions 191, and 192 are the regions defined in the operation surface 190. The structure and the function of the operation surface 190 are mentioned below. For realizing desired operation by a user, the information reception device 1 is constituted as device which receives information (desired information by the user) including a command, a parameter, etc. for realizing the desired operation.

Figure 2:
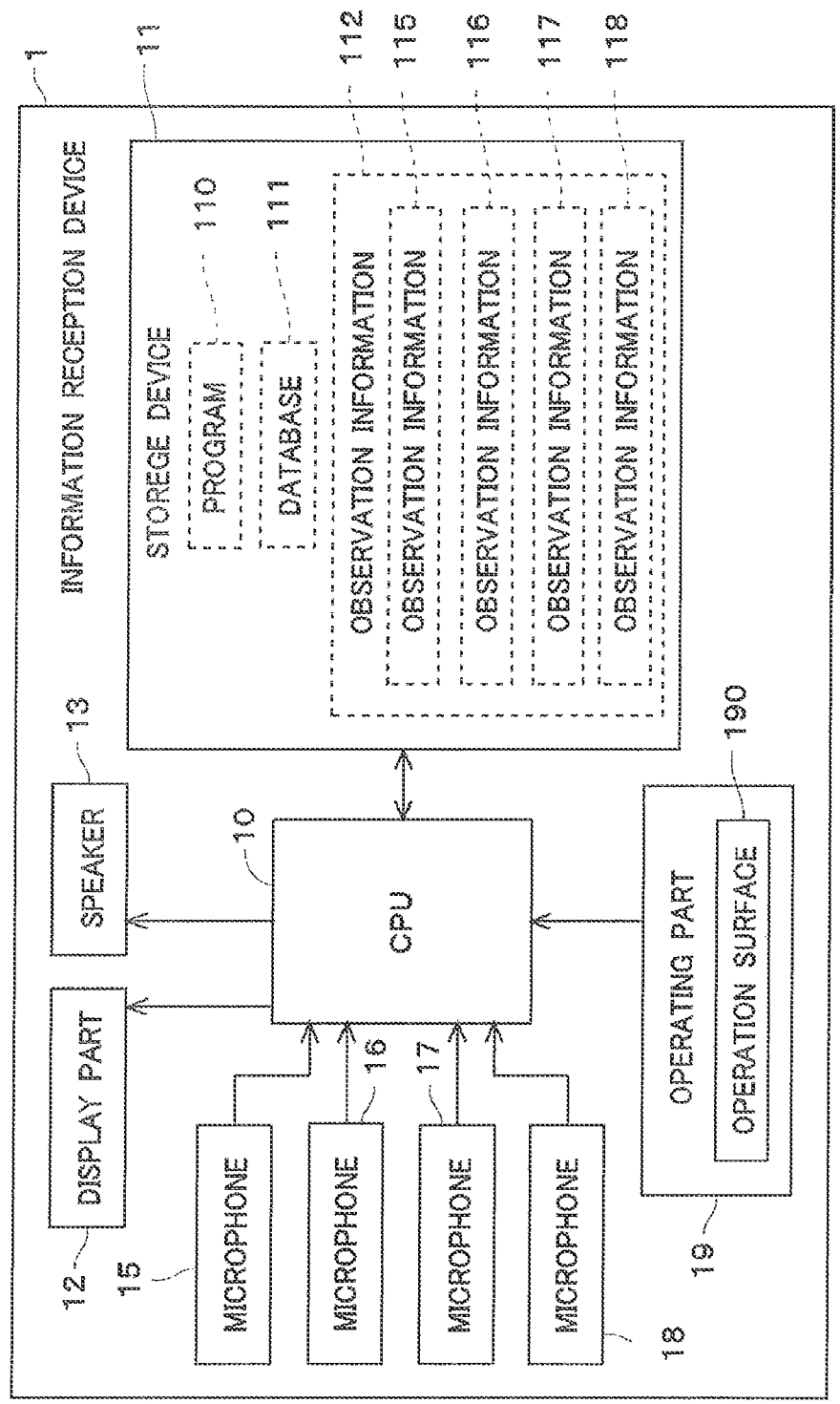
FIG. 2 is a block diagram shows the information reception device in the preferred embodiment.

FIG. 2 is a block diagram shows the information reception device 1 in the preferred embodiment. The information reception device 1 includes a CPU 10, a storage device 11, a display part 12, a speaker 13, and an operating part 19.

The CPU 10 executes a program 110 stored in the storage device 11 while reading it, thereby performing calculation of various kinds of data, generation of control signals, and the like. Thus, the CPU 10 has a function of controlling various components included in the information reception device 1 and calculating and creating various kinds of data. That is, the information reception device 1 is configured as a general computer.

The storage device 11 provides a function of storing various kinds of data in the information reception device 1. In other words, the storage device 11 stores electronically fixed information in the information reception device 1.

As the storage device 11, a RAM and a buffer used as a temporal working area of the CPU 10, a read-only ROM, a non-volatile memory (e.g., a NAND memory), a hard disk storing a relatively large amount of data, a portable recording medium (e.g., a CD-ROM, a DVD-ROM, a PC card, an SD card, a USB memory) mounted onto a dedicated reader device can be considered, for example. In FIG. 2, the storage device 11 is shown as if it formed a single structure. However, the storage device 11 is usually formed by more than one of the above listed various types of devices (or medium), which are employed as necessary. That is, the storage device 11 is a general term referring to devices each having a function of storing data.

The actual CPU 10 is an electronic circuit including therein a RAM that allows a high-speed access thereto. Such a storage device included in the CPU 10 is described as being also included in the storage device 11 for convenience of the description. That is, it is described that data temporarily stored by the CPU 10 itself is also stored in the storage device 11. As shown in FIG. 2, the storage device 11 is used to store the program 110, a database 111, observation information 112, etc.

The display part 12 is hardware having a function of displaying various kinds of information to the user to provide the information. As the display part 12, a lamp, an LED, a CRT, a liquid crystal display, a liquid crystal panel, etc. corresponds, for example.

According to the control signal from the CPU 10, the speaker 13 vibrates air by converting an electric signal. Thus, the speaker 13 has a function which reproduces sounds. Thereby, the information reception device 1 has a function as audio equipment which plays music etc.

A plurality of microphones 15, 16, 17, and 18 differ in the provided position in the information reception device 1 each other, and also are the same hardwares. Therefore, unless it refuses in particular, the following descriptions explains the microphone 15 as a representative.

The microphone 15 has a function which converts the surrounding sound to electrical signal. The electrical signal acquired with the microphone 15 is stored by the storage device 11 as the observation information 112. Here, a sound is actual vibration (vibration of the air which spreads the inside of the air) which arises in the environment around the microphone 15 (the information reception device 1). Therefore, the microphone 15 has a function which acquires observation result as the observation information 112, based on observing the actual vibration which arises in the surrounding environment.

As shown in FIG. 2, the observation information 112 includes observation information 115, 116, 117, and 118. The observation information 115 is information of sound acquired by the microphone 15, and the observation information 116 is information of sound acquired by the microphone 16. And the observation information 117 is information of sound acquired by the microphone 17, and the observation information 118 is information of sound acquired by the microphone 18. Thus, the observation information 112 is a general name of the information acquired by the microphones 15, 16, 17, and 18. And since the microphones 15, 16, 17, and 18 are arranged in a different position, respectively, the observation information 115, 116, 117, and 118 are information of sound which observed in the different position, each other.

Thus, when the information reception device 1 compares the observation information 115, 116, 117, and 118 acquired by the microphones 15, 16, 17, and 18 with which locating positions differ, a position of a sound source can be detected based on a specific sound. According to such a principle, the information reception device 1 (the CPU 10) specifies the position which contacts with the object in the operation surface 190, based on the observation information 112 which observed the arising sound when the object contacted with the operation surface 190.

The number of the microphones 15, 16, 17, and 18 are not respectively restricted to one. The information reception device 1 should be provided with at least one of the microphones 15, 16, 17, and 18. As long as the microphones 15, 16, 17, and 18 have a function which converts the surrounding sound to an electrical signal (observation information 112), another function or structure may be different each other.

The operating part 19 is hardware operable by the user for giving an instruction to the information reception device 1. As the operation unit 19, various buttons, keys, a switch, a touch panel, a pointing device, a jog dial, etc. corresponds, for example.

The operation surface 190 intentionally adjusted to the operating part 19 is formed so that a characteristic index vibration might be produced when the object contacted.

As already described, the operation surface 190 is formed in the surface of the housing of the information reception device 1. In more detail, in FIG. 1, the surface which is observed in XY planar view in the (+Z) direction of the information reception device 1, forms the operation surface 190. That is, the housing of the information reception device 1, itself constitutes the operating part 19.

Here, the operation surface 190 is described. For example, a struck sound which occurs when resin is struck with a finger is compared with a struck sound which occurs when metal is struck with a finger, the difference is clear even if it hears it with people's ear. Moreover, even if person who strikes is different, even if the struck strength has been changed, even if the object to strike has been changed into a thing like the touch pen instead of a finger, it is possible to identify struck sound of resin and struck sound of metal. That is, a struck sound peculiar to resin and a struck sound peculiar to metal are recognizable even by people's ear which considered that identification accuracy is lower than mechanical analysis. It is surmised that the struck sound which arises when an object strikes the operation surface 190 is a characteristic sound (vibration) whose dependence over the using object to strike, and how to strike is comparatively low.

For other example, the case where the surface of sand paper is rubbed with a finger is considered. Various fricatives are made according to the yarn count (granularity of surface) of sand paper. However, whether those who rub differ or the objects to rub differ, the fricative which arises by having rubbed the same sand paper approximates. That is, it turns out that the fricative peculiar to the surface structures (boom hoisting etc.) of the operation surface 190 is made about the case where an object moves contacting the operation surface 190. According to this, it is surmised that a sound (vibration) peculiar to surface structures (a material quality, a friction coefficient, etc.) of the operation surface 190 arises when the operation surface 190 is rubbed against an object.

The above thing is known experientially. Next, the result of having verified the above mentioned fact by objective experiment is shown.

Figure 3:
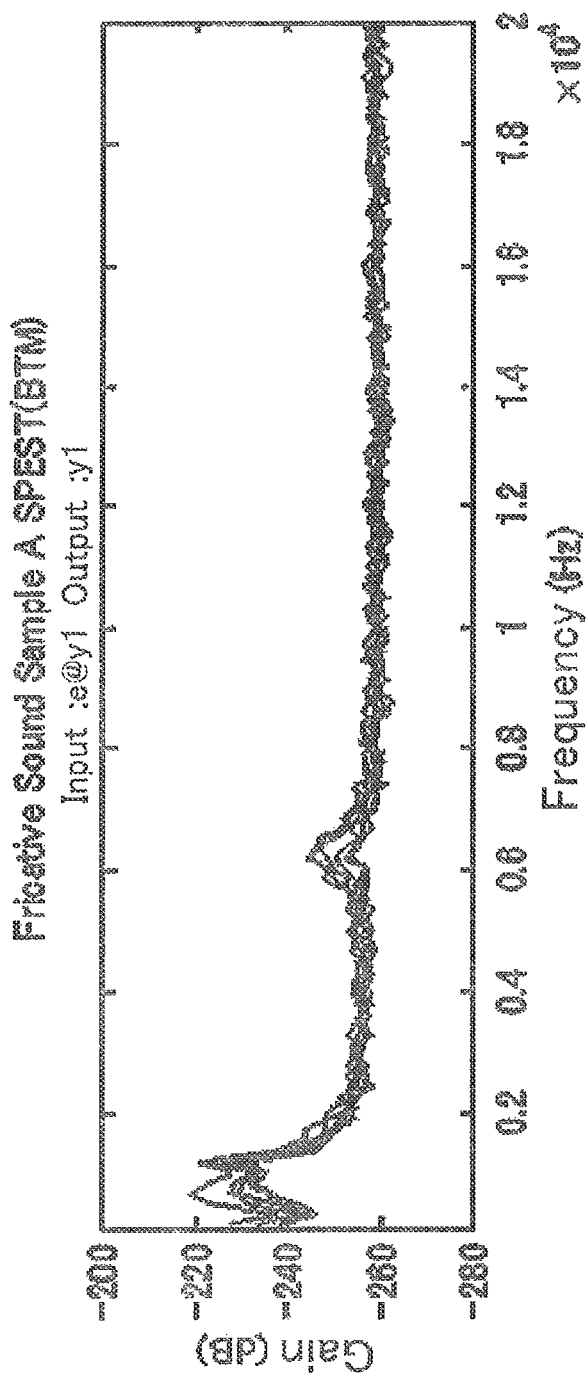
FIG. 3 shows a frequency distribution of fricative which occurs about a sample material when people rub a surface of the sample material by a finger.
Figure 4:
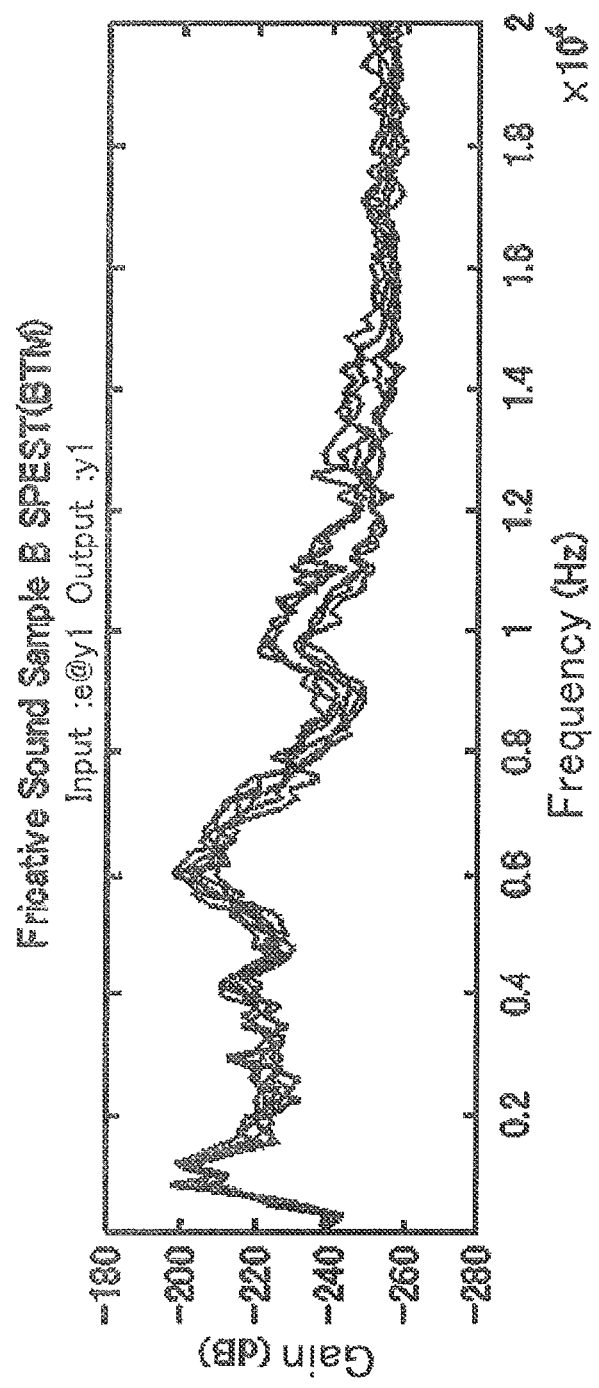
FIG. 4 shows a frequency distribution of fricative which occurs about a sample material when people rub a surface of the sample material by a finger.
Figure 5:
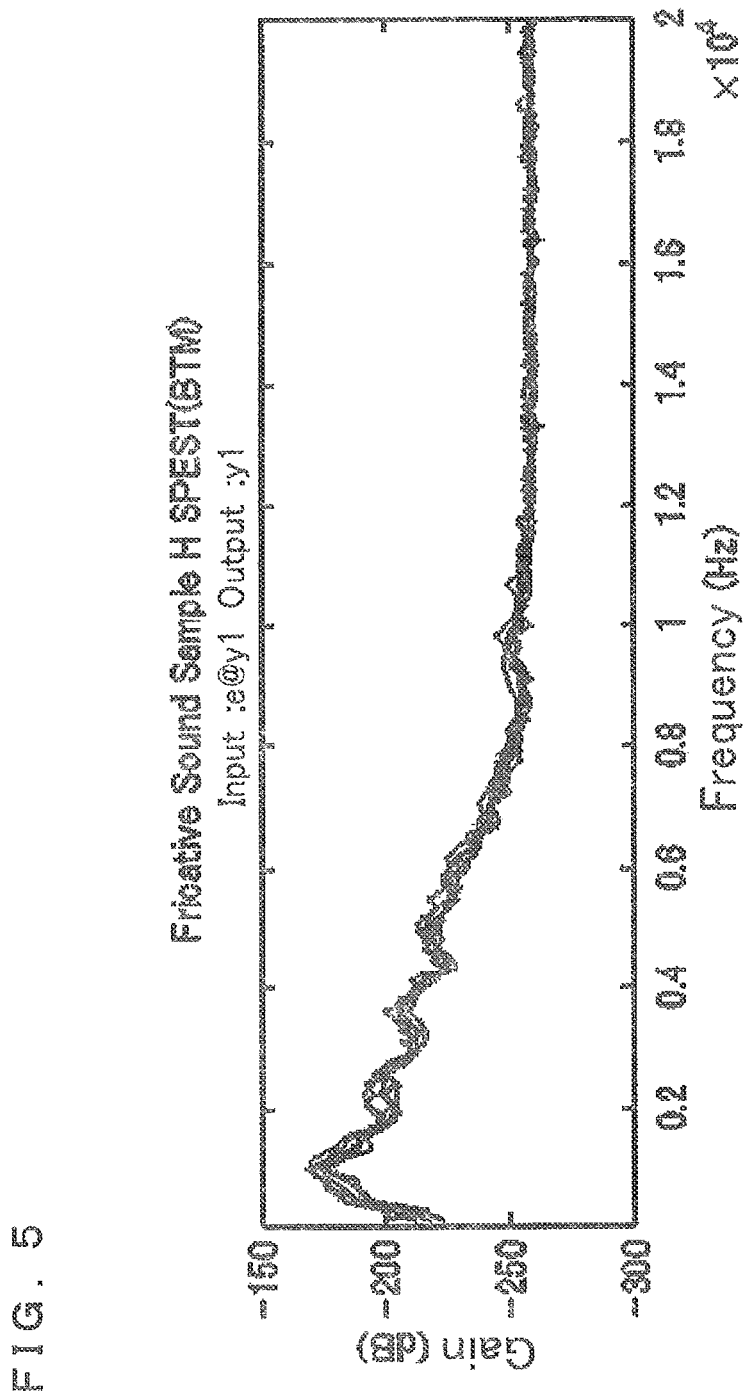
FIG. 5 shows a frequency distribution of fricative which occurs about a sample material when people rub a surface of the sample material by a finger.

FIG. 3 to 5 show a frequency distribution of fricative which arises about a sample material when people rub a surface of the sample material by a finger. In the example shown in FIG. 3 to 5, the used sample materials differ each other. FIG. 3 to 5 are each illustrating the fricative of six batches which arose when an examiner repeated six trials.

Clearly in FIG. 3 to 5, whatever the sample material used, correlation is looked at in six times trial about each fricative which arises when sample material is rubbed by the finger. That is, correlation fixed to the arising fricative is seen about the same sample material (in the example shown here, mutual frequency distribution is alike.).

On the other hand, between the characteristics (for example, frequency distribution shown in FIG. 3) of the fricative which arises in a certain sample material, and the characteristics (for example, frequency distribution shown in FIG. 4) of the fricative which arises in another sample materials, correlation is low. In other words, the frequency distribution of the fricative which arises in a different sample material is not alike.

From the above thing, if the surface structure of the operation surface 190 is determined, it is comparatively highly precise and can predict the vibration which arises when an object contacts the operation surface 190. Conversely saying, if the operation surface 190 adjusted in the reception device 1 so that a characteristic vibration might be generated are adopted as the operating part 19, judging whether the characteristic vibration arisen makes it possible to judge whether the operation surface 190 was operated or not. In the following descriptions, a characteristic vibration which arises when an object contacts the operation surface 190 is referred to as "index vibration".

Not only selection of material but also adjusting the boom-hoisting form of a material surface, for example, sputtering, etching, etc. can be used as technique to adjust the surface structure of the operation surface 190 so that a predetermined characteristic vibration might be generated.

As described above, when an object contacts the operation surface 190 which has the specific surface structure, it turns out that a characteristic index vibration occurs. However, in the experiment shown in FIG. 3 to 5, the actual vibration of six batches is not thoroughly in agreement. That is, though the actual vibration which can be judged including the index vibration arises, the actual vibration is not a match completely each time. The actual vibration produces the difference by the method of contact and the physical properties of the contacting object, etc.

In other words, the ingredient of the index vibration and ingredient of individual vibration according to other factors are contained in the actual vibration observed. The observation information 112 which recorded by observing actual vibration, includes the information acquired by analyzing the actual vibration besides the information of the ingredient of vibration.

Thus, the information resulting from the factor which may change for every one operation by the user among the information included in the observation information 112 is hereafter called "supplementary information". As the supplementary information, for example, the "duration time of vibration" (equivalent to operation period), an "oscillating strength of vibration" (equivalent to operation strength), a "contact position" (equivalent to an operation position), a "moving velocity of contact position" (equivalent to an operation velocity), and a "moving direction of contact position" (equivalent to an operation direction), etc. are considered.

Vibration which arises when the contacting object moves on the operation surface 190, is used for the information reception device 1 in the preferred embodiment as the index vibration. That is, like a struck sound, vibration in which the duration time of vibration is comparatively short is not used for index vibration. The "contact position", the "moving direction of a contact position", and the "migration length of a contact position" are used for the information reception device 1 in the preferred embodiment as the supplementary information.

FIG. 6 shows the database 111 in the preferred embodiment. The database 111 has a table structure by which one record is created about one candidate information (information which serves as a candidate of input information). In the example shown in FIG. 6, six pieces of candidate information are stored in the database 111. A "number" is given to each candidate information, and each candidate information is separately identifiable by the given number.

In the preferred embodiment, only one index vibration is defined. The information reception device 1 judges the existence of the index vibration according to the frequency distribution of the index vibration. Therefore, all of the six pieces of candidate information shown in FIG. 6 are related with the same index vibration (frequency distribution).

The item for associating the information about a "position", a "direction", and a "distance" is provided in each record of the database 111. These are the supplementary information equivalent to the "contact position", the "moving direction of the contact position", and the "migration length of the contact position", respectively.

The item of the "position" means the position where the object contacted the operation surface 190. In the example shown here, four pieces of candidate information (candidate information identified by a number 001, 002, 003, or 004) are related with the region 191, and two pieces of candidate information (candidate information identified by a number 005 or 006) are related with the region 192.

The item of the "direction" means the direction in which the object in contact with the operation surface 190 moved. The "direction" can be determined according to the "position" which changes with a lapse of time. In the example shown in FIG. 6, the two pieces of candidate information are related, respectively about the (+X) direction and the (−X) direction. And one candidate information is related, respectively about the (+Y) direction, and the (−Y) direction.

The item of the "distance" means the distance in which the object in contact with the operation surface 190 moved. In the example shown here, the two pieces of candidate information are related with distance "5" and "10", respectively. However, about the candidate information identified by a number 005 or 006, the "distance" is not related but it means that the "distance" about such candidate information is not needed. The unit in "distance" may be defined arbitrarily.

Figure 7:
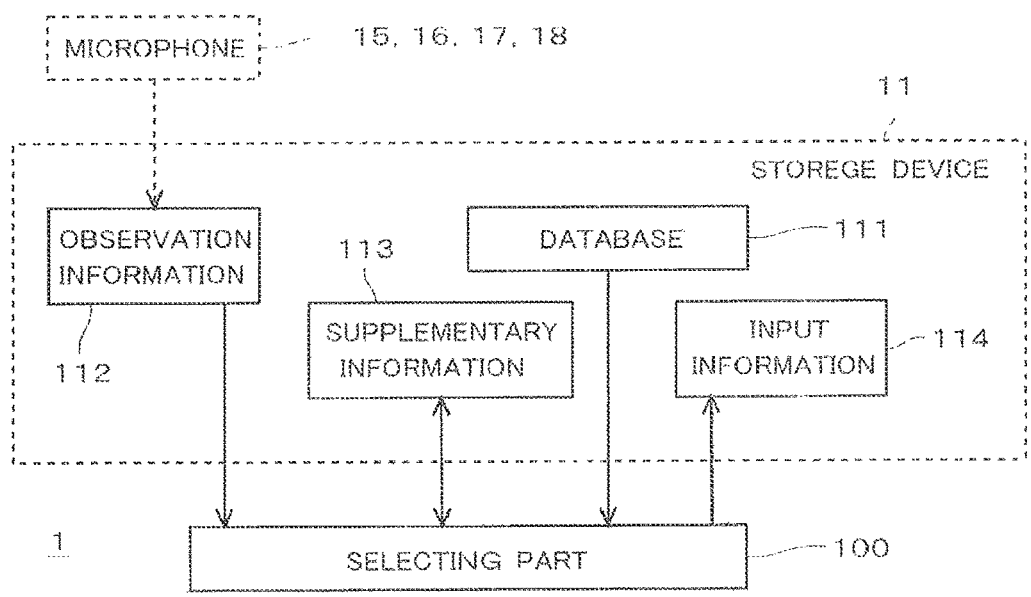
FIG. 7 shows functional blocks included in the information reception device in the preferred embodiment, together with data flow.

FIG. 7 shows functional blocks included in the information reception device 1 in the preferred embodiment, together with data flow. The selecting part 100 shown in FIG. 7 is a functional block achieved by an operation of the CPU 10 in accordance with the program 110.

The selecting part 100 judges whether the index vibration in the observation information 112 acquired with the microphones 15, 16, 17, and 18 exists or not. More specifically, the selecting part 100 analyzes the actual vibration included in the observation information 112, and acquires the frequency distribution of the actual vibration therein. Next, the selecting part 100 compares the frequency distribution of the actual vibration acquired, to the frequency distribution of the index vibration stored in the database 111. When the frequency distribution of the actual vibration approximates with the frequency distribution of the index vibration, the selecting part 100 judges that the index vibration is included in the actual vibration.

According to the preferred embodiment, the four pieces of observation information 115, 116, 117, and 118 are acquired with the four microphones 15, 16, 17, and 18. The selecting part 100 judges whether the index vibration exists about the actual vibration currently recorded on each of the four pieces of observation information 115, 116, 117, 118, respectively. Therefore, when the index vibration exists in either of the four pieces of observation information 115, 116, 117, or 118, the selecting part 100 judges with the index vibration existing.

Thus, the information reception device 1 can decrease false negative in detection of the index vibration in the observation information 112 by having a plurality of microphones 15, 16, 17, and 18. Therefore, the detection accuracy of the index vibration improves.

In the frequency distribution of the actual vibration, it is not necessary to compare with the frequency distribution of the index vibration about all frequency bands. For example, as a result of repeating trial, only the frequency distribution in a frequency band with comparatively high reproducibility may be compared. It is not limited to an audible sound region.

The selecting part 100 also has a function to extract the required supplementary information 113, based on the observation information 112. As FIG. 6 is already shown, in the database 111 in the preferred embodiment, the supplementary information 113 (a position, a direction, and a distance) is linked with a plurality of candidate information which serves as a candidate of the input information 114.

Therefore, the selecting part 100 acquires the contact position (position), the moving direction (direction) of the contact position, and the migration length (distance) of the contact position, based on the observation information 112. Based on the sound (observation information 112) acquired with several microphones 15, 16, 17, and 18 with which locating positions differ, the selecting part 100 can realize the technique of specifying the position of the sound source by adopting a conventional technology, as already described.

The selecting part 100 searches the database 111 based on the existence of the index vibration and the supplementary information 113 detected from the observation information 112. And the selecting part 100 selects the candidate information which should be made the input information 114 from a plurality of candidate information, and the selecting part 100 creates the input information 114.

The above is the description of structure and functions of the information reception device 1 in the preferred embodiment. Next, operation of the information reception device 1 is described.

Figure 8:
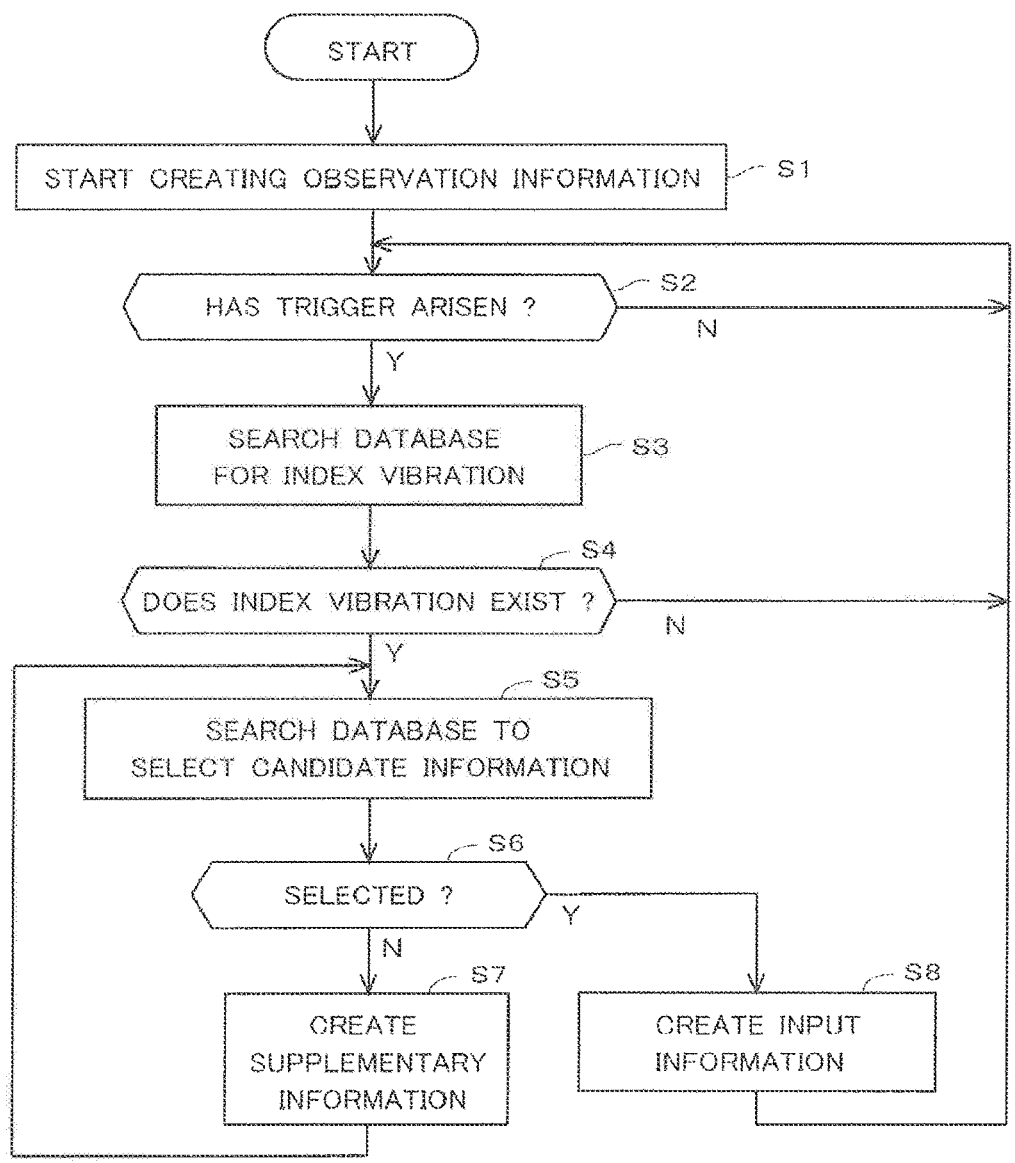
FIG. 8 is a flow chart showing operation of the information reception device in the preferred embodiment.

FIG. 8 is a flow chart showing operation of the information reception device 1 in the preferred embodiment. It is assumed that before each Step in FIG. 8 is performed, the database 111 is stored in the storage device 11 of information reception device 1. That is, it is assumed that the process of storing the database 111 in the storage device 11 has already finished.

When connected to a power supply source, the information reception device 1 starts the processing shown in FIG. 8, after performing predetermined initial setting (not shown).

When the processing shown in FIG. 8 is started, the information reception device 1 starts creation of the observation information 112 (the observation information 115, 116, 117, and 118) with the microphones 15, 16, 17, and 18 (Step S1). Henceforth, unless it refuses in particular, the information reception device 1 continues creation of the observation information 112.

The information reception device 1 monitors arising of a trigger, after starting creation of the observation information 112 (Step S2). According to the preferred embodiment, as a result of analyzing the observation information 112, when the sound beyond a threshold value [dB] is detected in a predetermined frequency band, it judges the trigger arose. However, the trigger is not limited to this. For example, a timing which comes with a predetermined cycle is possible for the trigger.

When the trigger arises (Yes in Step S2), the selecting part 100 acquires the frequency distribution of the sound (the actual vibration) which arisen based on the observation information 112. And the selecting part 100 searches the database 111 for detecting the index vibration according to the frequency distribution of the actual vibration (Step S3).

In Step S3, when at least one frequency distribution similar to the frequency distribution of the actual vibration used as a search key exists in the item of the "index vibration" of the database 111, the selecting part 100 judges the index vibration exists in the actual vibration, and judges "Yes" in Step S4. On the other hand, when the frequency distribution similar to the frequency distribution of the actual vibration used as the search key does not exist in the item of the "index vibration" of the database 111, the selecting part 100 judges the index vibration does not exist in the actual vibration, and judges "No" in Step S4.

In Step S4, when the judgement is "No", the information reception device 1 regards that the sound detected as the trigger is not the sound which arisen when the object contacted to the operation surface 190. That is, the information reception device 1 regards that no operation to the operation surface 190 by the user has been carried out. In that case, the information reception device 1 returns to Step S2, and continues processing. Thus, when it regards that no operation to the operation surface 190 has been carried out, the information reception device 1 does not create the input information 114.

The frequency distribution of the index vibration is defined comparatively strictly. That is, the wrong judgement that the index vibration exists within sounds other than the sound which arises in the operation surface 190 is reduced. Therefore, a possibility of creating the wrong input information 114 based on the sound other than the sound which arises in the operation surface 190 by the information reception device 1 is low, compared with a conventional technology.

In Step S4, when the judgement is "Yes", the selecting part 100 performs a search of the database 111 for selecting the candidate information using the frequency distribution of the index vibration as the search key (Step S5). Namely, the selecting part 100 searches the candidate information related with the search key by using the frequency distribution of the index vibration as the search key. The search key in Step S5 may be the frequency distribution of the actual vibration used at Step S3.

As the result of the search in Step S5, when only one applicable candidate information exists in the database 111, the selecting part 100 regards that the candidate information has been selected, and judges "Yes" in Step S6. And the input information 114 is created based on the selected candidate information (Step S8).

Executing Step S8 means that the candidate information shown in the input information 114 has been received by the information reception device 1 as input information by the user. Therefore, after Step S8 has been performed, processing (not shown) according to the input information 114 is performed. When Step S8 is executed and the processing according to the input information 114 is performed, the information reception device 1 returns to the state of monitoring trigger, again.

On the other hand, when a plurality of applicable candidate information exists in the database 111 as the result of the search in Step S5, the selecting part 100 cannot narrow down the candidate information to one. In that case, it is regarded that the selection part 100 is not able to select the specific candidate information. And the selecting part 100 gives "No" as the decision result in Step S6.

In Step S4, when the judgement is "No", the selecting part 100 analyzes the observation information 112, and creates the supplementary information 113 based on the information acquired from the observation information 112 (Step S7). According to the preferred embodiment, as already described, the "position", the "direction", and the "distance" are acquired as the supplementary information 113.

After Step S7 is executed, the selecting part 100 executes Step S5 again. At this time, the selecting part 100 uses not only the frequency distribution of the index vibration but the information stored in the supplementary information 113, as the search key for searching the database 111.

Thereby, when Step S5 is executed in the second times, narrowing down of the candidate information to one is attained, and it is judged "Yes" in Step S6. And when the judgement is "Yes" in Step S6, the selecting part 100 executes Step S8, and the input information 114 is created.

In the preferred embodiment, when Step S7 is executed, all of the supplementary information 113 defined in the database 111 is acquired. However, it may be possible that only some of the supplementary information 113 is acquired at once. First, acquiring the "position" and searching, when it is not still able to select, Step S7 may be repeated. It may be constituted so that the supplementary information 113 about the "direction" and the "distance" may be acquired sequentially by repeating Step S7.

Next, the information input method which inputs desired information as the input information 114 using the information reception device 1 by the user is described. In the following descriptions, it describes about a desired example that the user desires to listen to music, and further makes volume increase by "10" units.

The database 111 shall be stored by the storage device 11 of the information reception device 1 before operation by the user. The information reception device 1 has already started creation of the observation information 112 (Step S1), and it is assumed that the information reception device 1 is in the state of monitoring trigger.

First, the user who wants to listen to music has to switch on the power supply of the information reception device 1. The user rubs the region 192 of the operation surface 190 at the (+Y) direction by the finger. Thus, when the user's finger contacts and rubs the operation surface 190, the characteristic fricative (the actual vibration) arises from the operation surface 190. Conversion to signals of this fricative is carried out with the microphones 15, 16, 17, and 18, and the observation information 112 is created.

The information reception device 1 detects the arising of trigger according to the fricative, and searches the database 111 using the frequency distribution of the detected fricative (Step S3). The detected fricative used for search here arose by having rubbed the operation surface 190. Therefore, the frequency distribution of the detected fricative is similar to the frequency distribution of the index vibration, and a matchable frequency distribution is detected in the database 111. Thereby, the information reception device 1 judges that the index vibration exists (Yes in Step S4).

Next, using the frequency distribution of the index vibration detected within the database 111 as the search key, the information reception device 1 searches the database 111, and searches the candidate information related with the frequency distribution of the index vibration (Step S5).

In the database 111 shown in FIG. 6, there is the six pieces of candidate information related with the frequency distribution of the index vibration. Therefore, in this stage, the information reception device 1 judges that the selection of the candidate information is not completed, and executes Step S7. That is, the selecting part 100 creates the supplementary information 113 based on the observation information 112.

Here, the "position" in which the user operated exists in the region 192. Therefore, the number which indicates the candidate information is narrowed down of "005" or "006". Further, the "direction" is the (+Y) direction, so the candidate information which is indicated by the number "005" is selected. The result of the candidate information selection, in Step S6, the decision result is judged "Yes", and the input information 114 is decided to "powering-on command".

Thus, when the user rubs the region 192 of the operation surface 190 by the finger in the (+Y) direction, the "powering-on command" is input. Therefore, by the execution of the command, the power supply of the information reception device 1 is switched on, like the user wanted. As for whether the power supply is switched on, it is preferable that the user enables it to check by performing a predetermined display to the display part 12.

When the power supply of the information reception device 1 is switched on and the sound is reproduced from the speaker 13, the user wishes to adjust so that it may become favorite volume. As described above, it describes here about the example in which volume is increased by "10" units.

The user who wishes to increase only "10" units volume rubs the region 191 of the operation surface 190 in the (+X) direction, by the finger. In this case, the distance which is rubbed is equivalent to "10" units. By this operation, the characteristic fricative (the actual vibration) arises from the operation surface 190. Conversion to the signals of this fricative are carried out with the microphones 15, 16, 17, and 18, and the observation information 112 is created.

The information reception device 1 detects the arising of trigger according to the fricative, and searches the database 111 using the frequency distribution of the detected fricative (Step S3). The detected fricative used for search here arose by having rubbed the operation surface 190. Therefore, the frequency distribution of the detected fricative is similar to the frequency distribution of the index vibration, so a matchable frequency distribution is detected in the database 111. Thereby, the information reception device 1 judges that the index vibration exists (Yes in Step S4).

Next, using the frequency distribution of the index vibration detected within the database 111 as the search key, the information reception device 1 searches the database 111, and searches the candidate information related with the frequency distribution of the index vibration (Step S5).

In the database 111 shown in FIG. 6, there is the six pieces of candidate information related with the frequency distribution of the index vibration. Therefore, in this stage, the information reception device 1 judges that the selection of the candidate information is not completed, and executes Step S7. That is, the selecting part 100 creates the supplementary information 113 based on the observation information 112.

Here, the "position" which the user operated exists in the region 191. Therefore, the number which indicates the candidate information is narrowed down of "001", "002", "003", or "004". Further, the "direction" is the (+X) direction, so the number which indicates the candidate information is narrowed down of "001" or "002". Further, the "distance" is "10", so the candidate information which is indicated by the number "002" is selected. The result of the candidate information selection, in Step S6, the decision result is judged "Yes", and the input information 114 is decided to the "volume increase command 10".

Thus, when the user rubs the region 191 of the operation surface 190 by the finger in the (+X) direction, only the distance which is equivalent to "10" units, the "volume increase command 10" is input. Therefore, by the execution of the command, increasing of only "10" units about the volume of the speaker 13 is accomplished, like the user wanted.

Thus, the information reception device 1 can select the command defined as the candidate information. Additionally, the information reception device 1 makes it possible to input such information according to defining a parameter for executing command as the candidate information. In the example shown here, the "distance" to which the user moved the finger is input as the "quantity of increase" of volume. Therefore, it can be provided the information input method which is easy to understand intuitively by the user.

As mentioned above, in the preferred embodiment, the information reception device 1 receives the input information 114 according to the user's operation. The information reception device 1 includes: the operation surface 190 which is adjusted to produce the characteristic index vibration by the object contact; the storage device 11 stores the candidate information (the candidate information is related with the index vibration) which serves as the candidate of the input information 114; the microphones 15, 16, 17, and 18 which acquire the observation information 112 according to observation of the actual vibration arising in the surrounding environment; and the CPU 10. The CPU 10 (the selecting part 100) judges whether or not the index vibration exists in the observation information 112 acquired. When the CPU 10 judges that the index vibration exists, the CPU 10 selects the candidate information which is related with the index vibration as the input information 114. Thus, according to employing the operation surface 190 which is intentionally adjusted for inputting the input information 114, the accuracy of the judgement about the existence of the index vibration in the observation information 112 is improved. The input information 114 can be input without capturing an image like a conventional technology, when inputting using the actual vibration which arises according to the user's operation.

The index vibration is the vibration arising when the object is contacting and moving on the operation surface 190. For example, compared with a struck sound etc., the vibration by friction continues a long period. Therefore, many specific points can be analyzed by defining as the index vibration such vibration (friction vibration), for example. Thereby, the accuracy of the judgement about the existence of the index vibration in the observation information 112 improves further. However, the struck sound etc. also can be considering as the index vibration. Defining both of the friction vibration and the struck sound as the index vibration, and when either is detected, it can treat as what detected operation by the user.

In the database 111 storing in the storage device 11, the candidate information which is related with the index vibration and stored, includes a plurality of the candidate information which are related with different supplementary information 112 each other. When the existence of the index vibration has been detected, the selecting part 100 acquires the supplementary information 113 according to the observation information 112 acquired. The selecting part 100 selects the candidate information which is related with the index vibration as the input information 114, according to the supplementary information 113 acquired. Thereby, based on the information other than the existence of the index vibration included in the observation information 112, the candidate information can be selected as the input information 114. Therefore, flexibility improves.

The supplementary information 113 includes the information about the position of the user's operation to the operation surface 190. Thereby, based on the user's operation position, the different candidate information can be selected as the input information 114. Therefore, flexibility improves.

The information reception device 1 includes a plurality of microphones (the microphones 15, 16, 17, and 18) in which the positional relationship with the operation surface 190 differs each other. According to this provided structure, each observation information 115, 116, 117 and 118 is acquired by the microphones 15, 16, 17, and 18. And the selecting part 100 acquires the information (e.g., the information about distinction whether the position is in the region 191 or in the region 192) about the position of the user's operation to the operation surface 190 as the supplementary information 113, based on comparing the observation information 115, 116, 117 and 118 each other. Compared with the conventional case which provides a digital camera etc. and acquires a position by this, the information about the position of the user's operation is acquirable easily and inexpensive.

The supplementary information 113 includes the information about the user's operation distance in the operation surface 190. Thereby, based on the user's operation distance, the different candidate information can be selected as the input information 114. Therefore, flexibility improves.

The supplementary information 113 includes the information about the user's operation direction in the operation surface 190. Thereby, based on the user's operation direction, different candidate information can be chosen as the input information 114. Therefore, flexibility improves.

Already described above, the information reception device 1 includes the plurality of microphones (the microphones 15, 16, 17, and 18) in which the positional relationship with the operation surface 190 differs each other. Based on each observation information 115, 116, 117 and 118 which are acquired by the microphones 15, 16, 17, and 18, the selecting part 100 judges the existence of the index vibration. Thereby, rather than observation with the one microphone 15, for example, the leakage in detection can be reduced, and the accuracy of the judgement about existence of the index vibration is improved.

The microphones 15, 16, 17, and 18 observe the sound which is arising in the surrounding environment as the actual vibration. That is, by considering a "sound" as a real vibration, the microphones 15, 16, 17, and 18 comparatively cheap as observation equipment which acquires the observation information 112 can be employed. Therefore, the information reception device 1 can observe the real vibration easily and with high precision.

According to the preferred embodiment, the index vibration is used only for the judgment of whether the user's operation is carried out. And in the preferred embodiment, the supplementary information 113 is used to select one candidate information from the plurality of candidate information. However, it is also possible to perform narrowing down from a plurality of candidate information not only by the supplementary information 113 but by the index vibration.

Figure 9:
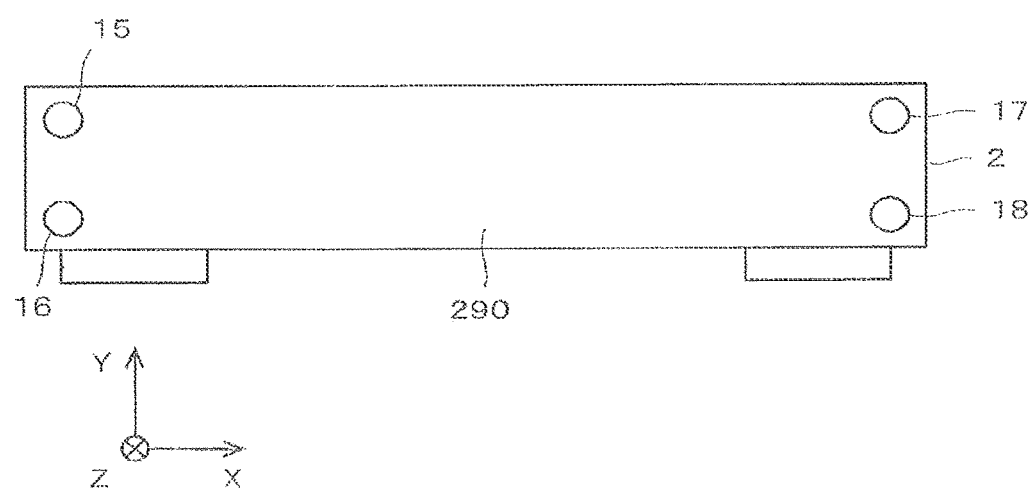
FIG. 9 shows an information reception device in another preferred embodiment.

FIG. 9 shows an information reception device 2 in another preferred embodiment. In the following descriptions, for the information reception device 2 in the other preferred embodiment, the same structures as those in the information reception device 1 in the preferred embodiment are labeled with the same reference signs, and the description thereof is omitted as appropriate.

As shown in FIG. 9, the information reception device 2, instead of the operation surface 190, is different from the information reception device 1 in that an operation surface 290 are formed.

Like the operation surface 190, the operation surface 290 is adjusted so that the characteristic index vibration may arise. However, the operation surface 290 is adjusted so that first index vibration may be produced, when moving the object which touches to the (+X) direction, and when moving the object which touches to the (−X) direction, it is adjusted so that a different index vibration (second index vibration) from the first index vibration may be produced. More specifically, when the user rubs the operation surface 290 in the (+X) direction, and when the user rubs the operation surface 290 in the (−X) direction, the operation surface 290 is adjusted so that the different index vibration may be produced.

Figure 10:
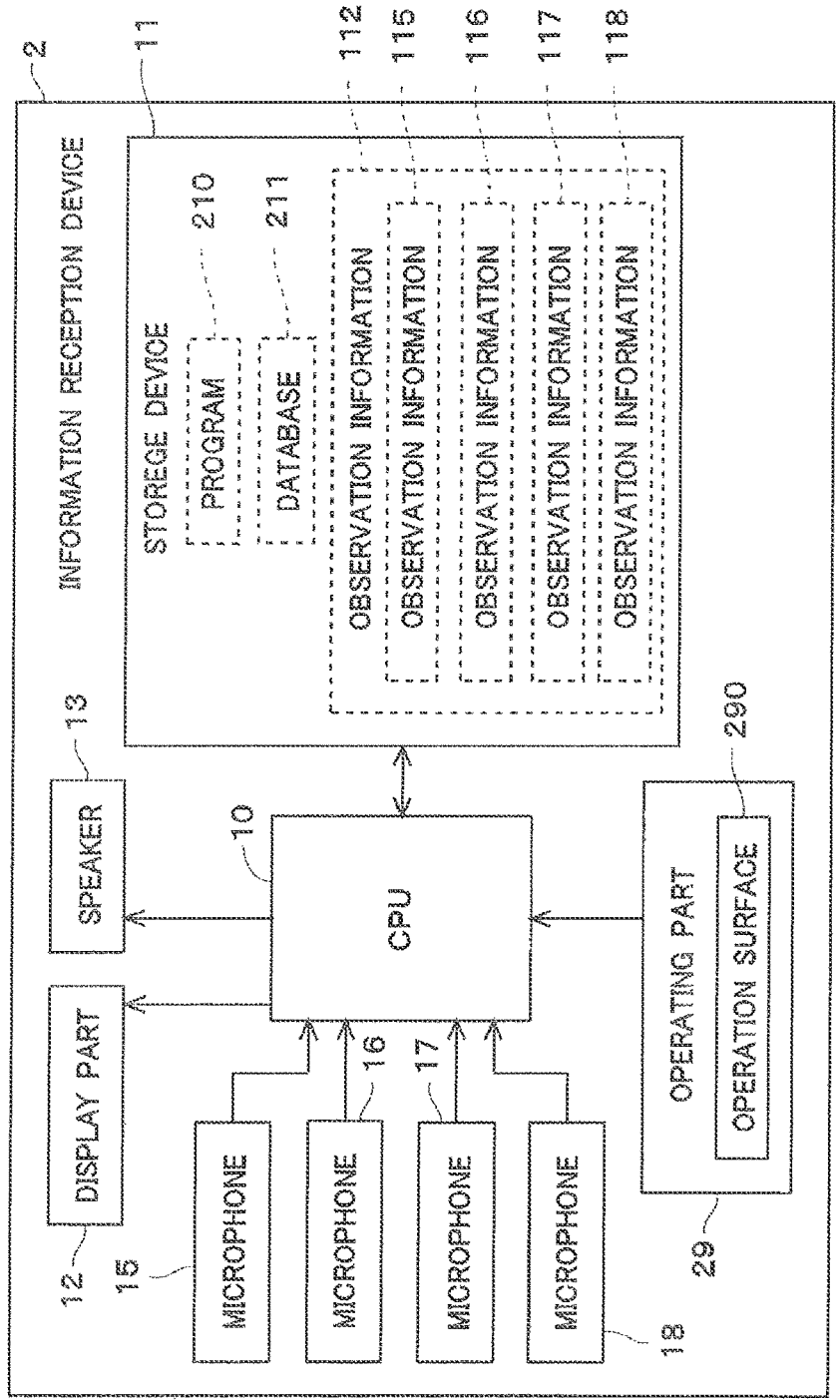
FIG. 10 is a block diagram of the information reception device 2 in the other preferred embodiment.

FIG. 10 is a block diagram of the information reception device 2 in the other preferred embodiment. The information reception device 2 includes the operating part 29 in which the operation surface 290 is formed, instead of the operating part 19. A program 210 and a database 211 are stored in the storage device 11 of the information reception device 2 instead of the program 110 and the database 111.

FIG. 11 shows the database 211 in the other preferred embodiment. In the database 211, the candidate information related with the frequency distribution of the first index vibration are the "volume increase command 5", the "volume increase command 10", and the "powering-on command". In the database 211, the candidate information related with the frequency distribution of the second index vibration are the "volume decrease command 5", the "volume decrease command 10", and the "powering-off command".

Next, the information input method which inputs desired information as the input information 114 using the information reception device 2 by the user is described. In the following descriptions, it describes about a desired example that the user desires to listen to music, and further makes volume decrease by "5" units.

The database 211 shall be stored by the storage device 11 of the information reception device 2 before operation by the user. The information reception device 2 has already started creation of the observation information 112 (Step S1), and it is assumed that the information reception device 2 is in the state of monitoring trigger.

First, the user who wants to listen to music has to switch on the power supply of the information reception device 2. The user rubs the operation surface 290 at the (+X) direction using the finger so that distance becomes equal or more than "20" units. Also in the information reception device 2, when the user's finger contacts and rubs the operation surface 290, the characteristic fricative (actual vibration) arises from the operation surface 290. Conversion to the signals of this fricative are carried out with the microphones 15, 16, 17, and 18 like the preferred embodiment, and the observation information 112 is created.

The information reception device 2 detects the arising of trigger according to the fricative recorded on the observation information 112, and searches the database 211 using the frequency distribution of the detected fricative (Step S3). The detected fricative used for search here arose by having rubbed the operation surface 290 in the (+X) direction. Therefore, the frequency distribution of the detected fricative is similar to the frequency distribution of the first index vibration, and a matchable frequency distribution is detected in the database 211. Thereby, the information reception device 2 judges that the index vibration (the first index vibration) exists (Yes in Step S4).

Next, using the frequency distribution of the first index vibration detected within the database 211 as the search key, the information reception device 2 searches the database 211 again, and searches the candidate information related with the frequency distribution of the first index vibration (Step S5).

In the database 211 shown in FIG. 11, the number of the candidate information related with the frequency distribution of the first index vibration is three, the "volume increase command 5", the "volume increase command 10", and the "powering-on command". Therefore, in this stage, the information reception device 2 judges that the candidate information cannot be selected and executes Step S7. That is, the selecting part 100 creates the supplementary information 113 based on the observation information 112.

Here, the "distance" operated by the user is equal or more than "20". Therefore, the candidate information is narrowed down of the "powering-on command", so the candidate information which is indicated by the number "005" is selected. Thus, the judgement in Step S6 is "Yes", so the input information 114 becomes "powering-on command".

Thus, when the user rubs the operation surface 290 by the finger in the (+X) direction as distance is equal or more than "20", the "powering-on command" is input. Therefore, by the execution of the command, the power supply of the information reception device 2 is switched on, like the user wanted. As for whether the power supply is switched on, it is preferable that the user enables it to check by performing the predetermined display to the display part 12.

When the power supply of the information reception device 2 is switched on and a sound is reproduced from the speaker 13, the user wishes to adjust so that it may become favorite volume. As described above, it describes here about the example in which volume is decreased by "5" units.

The user who wishes to decrease only "5" units volume rubs the operation surface 290 in the (−X) direction, by the finger. In this case, the distance which is rubbed is equivalent to "5" units. By this user's operation, the characteristic fricative (actual vibration) arises from the operation surface 290. Conversion to the signals of this fricative are carried out with the microphones 15, 16, 17, and 18, and the observation information 112 is created.

The information reception device 2 detects the arising of trigger according to the fricative, and searches the database 211 using the frequency distribution of the detected fricative (Step S3). The detected fricative used for search here arose by having rubbed the operation surface 290. Therefore, the frequency distribution of the detected fricative is similar to the frequency distribution of the second index vibration, so a matchable frequency distribution is detected in the database 211. Thereby, the information reception device 2 judges that the index vibration (the second index vibration) exists (Yes in Step S4).

Next, using the frequency distribution of the second index vibration detected within the database 211 as the search key, the information reception device 2 searches the database 211 again, and searches the candidate information related with the frequency distribution of the second index vibration (Step S5).

In the database 211 shown in FIG. 11, the number of the candidate information related with the frequency distribution of the second index vibration is three, the "volume decrease command 5", the "volume decrease command 10", and the "powering-off command". Therefore, in this stage, the information reception device 2 judges that the selection of the candidate information is not completed. Thus, the information reception device 2 executes Step S7. That is, the selecting part 100 creates the supplementary information 113 based on the observation information 112.

In this case, the "distance" operated by the user is "5" units. Therefore, the candidate information is narrowed down of the "volume decrease command 5", so the candidate information which is indicated by the number "003" is selected. Thus, the judgement in Step S6 is "Yes", so the input information 114 becomes the "volume decrease command 5".

Thus, when the user rubs the operation surface 290 by the finger in the (−X) direction as the distance is equivalent to "5" units, the "volume decrease command 5" is input. Therefore, by the execution of the command, reduction of only "5" units about the volume of the speaker 13 is accomplished, like the user wanted.

As described above, there is same effect not only in the information reception device 1, but also in the information reception device 2 in the other preferred embodiment. Thus, according to employing the operation surface 290 which is intentionally adjusted for inputting the input information 114, the accuracy of the judgement about the existence of the index vibration in the observation information 112 is improved.

Moreover, the index vibration includes: the first index vibration arising when the object is moved in the first direction; and the second index vibration different from the first index vibration arising when the object is moved in the second direction different from the first direction. The storage 11 stores the first candidate information (the "volume increase command 5", the "volume increase command 10", and the "powering-on command") corresponding to the first index vibration, and the second candidate information (the "volume decrease command 5", the "volume decrease command 10", and the "powering-off command") which is different from the first candidate information corresponding to the second index vibration. The selecting part 100 selects the first candidate information when the first index information exists, and selects the second candidate information when the second index information exists. Also by constituting in this way, the different information can be input according to the direction to which the object is moved. Therefore, flexibility improves.

When operate time is adopted instead of the operation distance as the supplementary information 113 in the other preferred embodiment, operation position becomes unnecessary to detect. In that case, since it becomes unnecessary to compare the plurality of observation information 115, 116, 117, and 118 each other, the supplementary information 113 can be input by only one microphone 15.

According to the other preferred embodiment, it described about the example using the operation surface 290 which produce the different index vibration according to the operating direction. However, the structure which produces the different index vibration is not limited to such structure.

Figure 12:
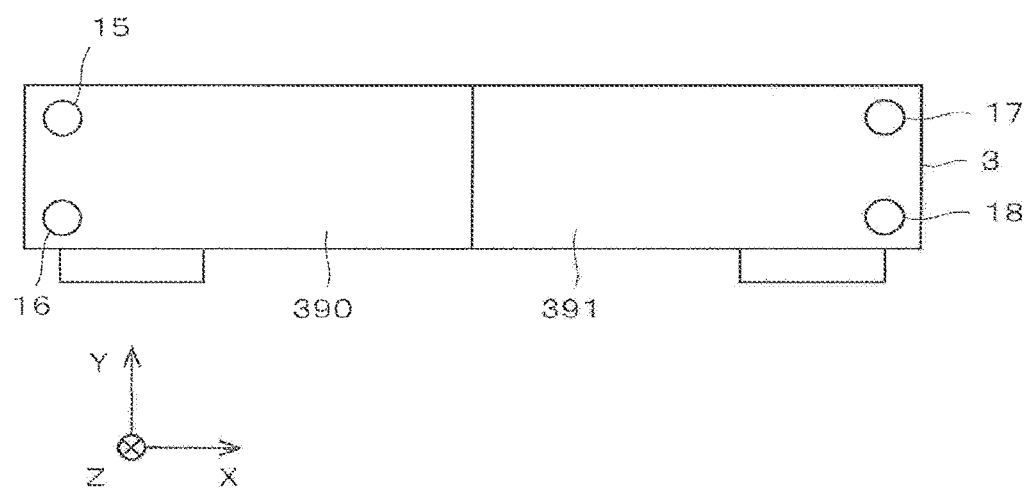
FIG. 12 shows an information reception device in still another preferred embodiment.
Figure 13:
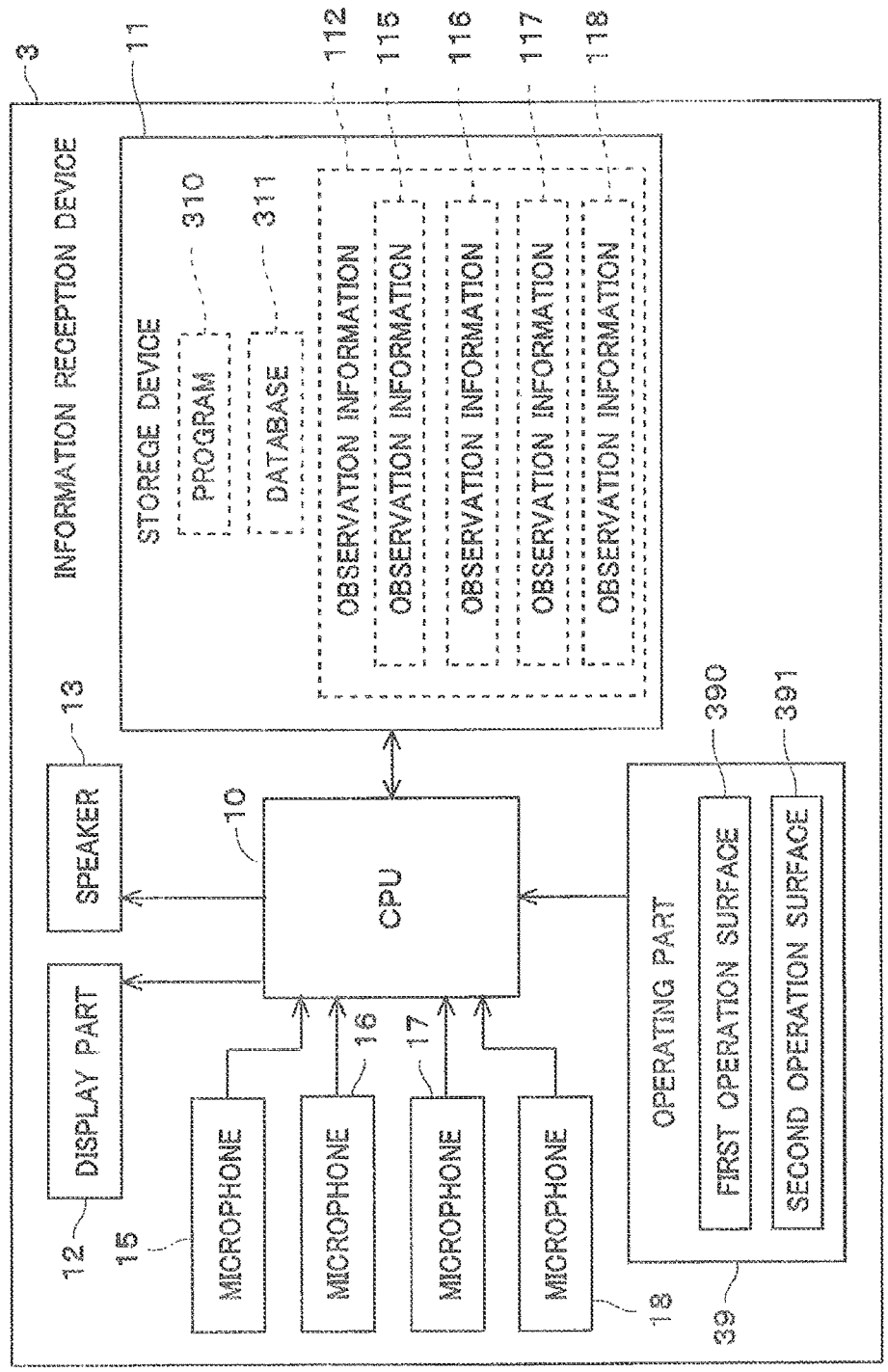
FIG. 13 is a block diagram of the information reception device in the still other preferred embodiment.

FIG. 12 shows an information reception device 3 in still another preferred embodiment. FIG. 13 is a block diagram of the information reception device 3 in the still other preferred embodiment. In the following descriptions, for the information reception device 3 in the still other preferred embodiment, the same structures as those in the information reception device 2 in the other preferred embodiment are labeled with the same reference signs, and the description thereof is omitted as appropriate.

The information reception device 3 in the still other preferred embodiment includes an operating part 39, instead of the operating part 29. A first operation surface 390 intentionally adjusted to the operating part 39 is formed so that a characteristic third index vibration might be produced when the object contacted. A second operation surface 391 intentionally adjusted to the operating part 39 is formed so that a characteristic fourth index vibration might be produced when the object contacted. A program 310 and a database 311 are stored in the storage device 11 of the information reception device 3 instead of the program 210 and the database 211.

FIG. 14 shows the database 311 in the still other preferred embodiment. In the database 311, the candidate information related with the frequency distribution of the third index vibration are the "volume increase command 5", the "volume increase command 10", and the "powering-on command". In the database 311, the candidate information related with the frequency distribution of the fourth index vibration are the "volume decrease command 5", the "volume decrease command 10", and the "powering-off command".

Next, the information input method which inputs desired information as the input information 114 using the information reception device 3 by the user is described. In the following descriptions, it describes about a desired example that the user desires to listen to music, and further makes volume decrease by "5" units.

The database 311 shall be stored by the storage device 11 of the information reception device 3 before operation by the user. The information reception device 3 has already started creation of the observation information 112 (Step S1), and the state of the information reception device 3 is in the state of monitoring trigger.

First, the user who wants to listen to music has to switch on the power supply of the information reception device 3. Therefore, the user rubs the first operation surface 390 using the finger so that distance becomes equal or more than "20" units. Also in the information reception device 3, when the user's finger contacts and rubs the first operation surface 390, the characteristic fricative (actual vibration) arises from the first operation surface 390. Conversion to the signals of this fricative are carried out with the microphones 15, 16, 17, and 18 like the other preferred embodiment, and the observation information 112 is created.

The information reception device 3 detects the arising of trigger according to the fricative recorded on the observation information 112, and searches the database 311 using the frequency distribution of the detected fricative (Step S3). In this case, the detected fricative used for search arose by having rubbed the first operation surface 390. Therefore, the frequency distribution of the detected fricative is similar to the frequency distribution of the third index vibration, and a matchable frequency distribution is detected in the database 311. Thereby, the information reception device 3 judges that the index vibration (the third index vibration) exists (Yes in Step S4).

Next, using the frequency distribution of the third index vibration detected within the database 311 as the search key, the information reception device 3 searches the database 311 again, and searches the candidate information related with the frequency distribution of the third index vibration (Step S5).

In the database 311 shown in FIG. 14, the number of the candidate information related with the frequency distribution of the third index vibration is three, the "volume increase command 5", the "volume increase command 10", and the "powering-on command". Therefore, in this stage, the information reception device 3 judges that the candidate information cannot be selected and executes Step S7. That is, the selecting part 100 creates the supplementary information 113 based on the observation information 112.

Here, the "distance" operated by the user is equal or more than "20". Therefore, the candidate information is narrowed down of the "powering-on command", so the candidate information which is indicated by the number "005" is selected. Thus, the judgement in Step S6 is "Yes", so the input information 114 becomes the "powering-on command".

Thus, when the user rubs the first operation surface 390 by the finger as the distance is equal or more than "20", the "powering-on command" is input. Therefore, by the execution of the command, the power supply of the information reception device 3 is switched on, like the user wanted. As for whether the power supply is switched on, it is preferable that the user enables it to check by performing the predetermined display to the display part 12.

When the power supply of the information reception device 3 is switched on and the sound is reproduced from the speaker 13, the user wishes to adjust so that it may become favorite volume. As described above, it describes here about the example in which volume is decreased by "5" units.

The user who wishes to decrease only "5" units volume nibs the second operation surface 391, by the finger. In this case, the distance which is rubbed is equivalent to "5" units. By this user's operation, the characteristic fricative (the actual vibration) arises from the second operation surface 391. Conversion to the signals of this fricative are carried out with the microphones 15, 16, 17, and 18, and the observation information 112 is created.

The information reception device 3 detects the arising of trigger according to the fricative, and searches the database 311 using the frequency distribution of the detected fricative (Step S3). The detected fricative used for search here arose by having rubbed the second operation surface 391. Therefore, the frequency distribution of the detected fricative is similar to the frequency distribution of the fourth index vibration, so a matchable frequency distribution is detected in the database 311. Thereby, the information reception device 3 judges that the index vibration (the fourth index vibration) exists (Yes in Step S4).

Next, using the frequency distribution of the fourth index vibration detected within the database 311 as the search key, the information reception device 3 searches the database 311 again, and searches the candidate information related with the frequency distribution of the fourth index vibration (Step S5).

In the database 311 shown in FIG. 14, the number of the candidate information related with the frequency distribution of the fourth index vibration is three, the "volume decrease command 5", the "volume decrease command 10", and the "powering-off command". Therefore, in this stage, the information reception device 3 judges that the candidate information cannot be selected and executes Step S7. That is, the selecting part 100 creates the supplementary information 113 based on the observation information 112.

In this case, the "distance" operated by the user is equivalent to "5" units. Therefore, the candidate information is narrowed down of the "volume decrease command 5", so the candidate information which is indicated by the number "003" is selected. Thus, the judgement in Step S6 is "Yes", so the input information 114 becomes the "volume decrease command 5".

Thus, when the user rubs the second operation surface 391 by the finger as the distance is equivalent to "5" units in the any direction, the "volume decrease command 5" is input. Therefore, by the execution of the command, reduction of only "5" units about the volume of the speaker 13 is accomplished, like the user wanted.

As described above, there are same effect not only in the information reception device 1 and 2, but also in the information reception device 3 in the still other preferred embodiment. Thus, according to employing the first and second operation surface 390 and 391 which are intentionally adjusted for inputting the input information 114, the accuracy of the judgement about the existence of the index vibration in the observation information 112 is improved.

As operation surface, the operating part 39 includes the first operation surface 390 adjusted to produce the characteristic third index vibration by the object contact, and the second operation surface 391 adjusted to produce the characteristic fourth index vibration by the object contact. The storage 11 stores the third candidate information (the "volume increase command 5", the "volume increase command 10", and the "powering-on command") corresponding to the third index vibration, and the fourth candidate information (the "volume decrease command 5", the "volume decrease command 10", and the "powering-off command") which is different from the third candidate information corresponding to the fourth index vibration. The selecting part 100 selects the third candidate information when the third index information exists; and selects the fourth candidate information when the fourth index information exists. Also by constituting in this way, the information reception device 3 can produce the different index vibration. Therefore, according to each index vibration, it is possible to input different information. Therefore, flexibility improves.

In the information reception devices 1, 2, and 3 in the plurality of preferred embodiments described above, the operation surface arising the index vibration, is fixed to the device. However, for example, composing so that the user can exchange the operation surface arbitrarily is possible. In all preferred embodiments, although the index vibration is used only for deciding of the candidate information, composing so that the user can enjoy the index vibration is possible.

Figure 15:
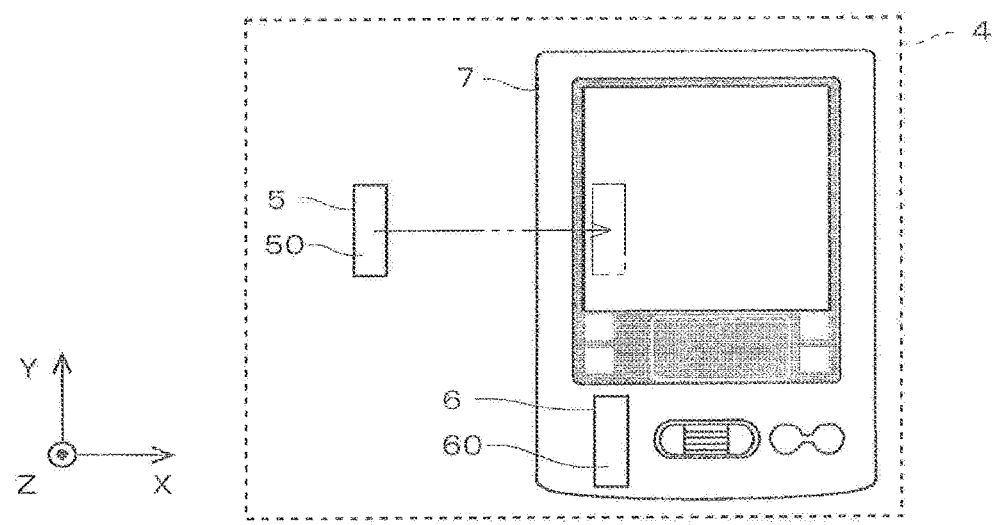
FIG. 15 shows an information reception system.

FIG. 15 shows an information reception system 4. The information reception system 4 includes a first operation target member 5, a second operation target member 6, and an information reception device 7. Although mentioned below for details, the information reception system 4 is constituted as a system which receives the information (the input information) according to the user's operation.

Figure 16:
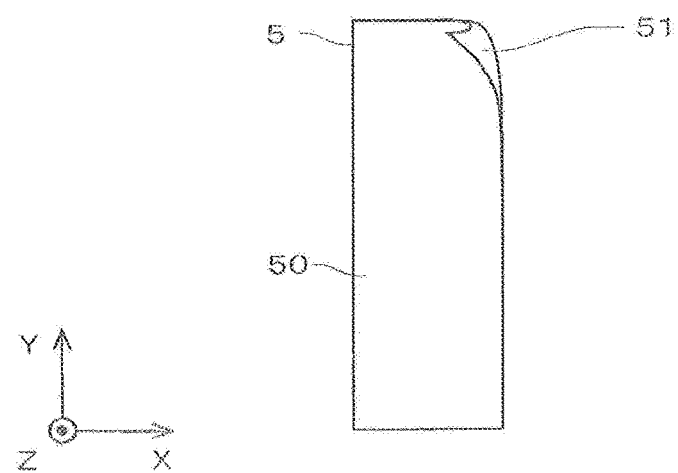
FIG. 16 shows a first operation target member.

FIG. 16 shows the first operation target member 5. In FIG. 16, a part of first operation target member 5 is illustrated as a state as if it turned over so that the back surface of the first operation target member 5 can be observed.

The thickness of the first operation target member 5 is thin in Z direction, and is constituted as a component of film state. The (+Z) side surface of the first operation target member 5 forms the operation surface 50. The explanation about the operation surface 50 is described below.

The (−Z) side surface of the first operation target member 5 forms the adherend 51. Although not illustrated for details, the adhesive material is applied to the surface of the adherend 51. By this, the first operation target member 5 constitutes a seal member. In FIG. 15, like an imaginary line shows, the first operation target member 5 can be attached on the information reception device 7.

In addition, it is desirable to adopt the material (material which does not lose adhesiveness when it removes) which can be repeatedly attached as an adhesive material applied to the adherend 51. Thereby, the first operation target member 5 is made attachable, and also detachable to the information reception device 7. Therefore, the user can perform exchange of the first operation target member 5, or change of the position by the user's own intention. That is, the user can customize the information reception system 4 depending to the user's taste.

Returning to FIG. 15, the second operation target member 6 constitutes a part of housings of the information reception device 7. In other words, a part of members of the housing of the information reception device 7 form the second operation target member 6. Therefore, the second operation target member 6 is a component which cannot exchange and cannot change a position, by the user.

The outer surface of the second operation target member 6 is forming the operation surface 60. The explanation about the operation surface 60 is described below.

Figure 17:
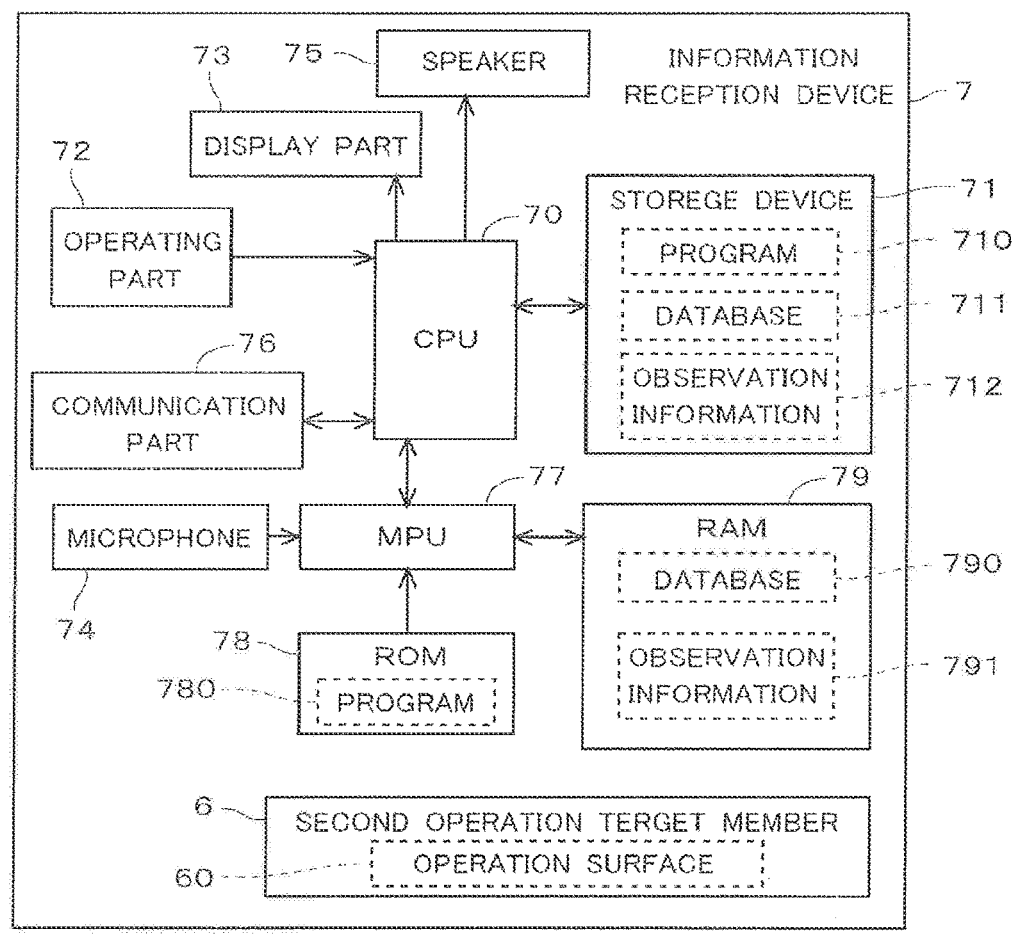
FIG. 17 is a block diagram of an information reception device which is included in the information reception system.

FIG. 17 is a block diagram of the information reception device 7 which is included in the information reception system 4. The information reception device 7 includes a CPU 70, a storage device 71, an operating part 72, a display part 73, a microphone 74, a speaker 75, and a communication part 76.

The information reception device 7 has first operational mode and second operational mode as operational mode. The first operational mode is the operational mode in which the function of the information reception device 7 is not restricted. In the first operational mode, the information reception device 7 operates in the state of the usual power consumption. On the other hand, the second operational mode is the operational mode which operates in the state of low power consumption compared with the first operational mode.

In the following description, the second operational mode of the information reception device 7 is described as the operational mode in which the electric power supply to the CPU 70 is stopped, as an example. That is, a state where the CPU 70 has been awakened (a state where electric power is supplied to the CPU 70) is called the "first operational mode". On the other hand, a state where the CPU 70 has been slept (a state where electric power is not supplied to the CPU 70) is called the "second operational mode". The information reception device 7 does not reduced only the power consumption in the CPU 70 in the second operational mode. For example, the electric power supply is stopped also about the composition of the display part 73 etc.

In the second operational mode, by restricting a part of functions of component such as the CPU 70 and the display part 73, a low-power-consumption state may be realized. That is, in order to realize the low-power-consumption state, the electric power supply to the target composition need not necessarily be stopped.

In order to realize the user's desired operation, the information reception device 7 is constituted as equipment which receives the information (the user's desired information), including the command and the parameter etc. for realizing the desired operation. However, the information reception device 7 is not limited to portable device (a smart phone, a mobile phone, PDA, etc.).

The CPU 70 executes a program 710 stored in the storage device 71 while reading it, thereby performing calculation of various kinds of data, generation of control signals, and the like. Thus, the CPU 70 has a function of controlling various components included in the information reception device 7 and calculating and creating various kinds of data. That is, the information reception device 7 is configured as a general computer.

The storage device 71 provides a function of storing various kinds of data in the information reception device 7. In other words, the storage device 71 stores electronically fixed information in the information reception device 7.

As the storage device 71, a RAM and a buffer used as a temporal working area of the CPU 70, a read-only ROM, a non-volatile memory (e.g., a NAND memory), a hard disk storing a relatively large amount of data, a portable recording medium (e.g., a PC card, an SD card, a USB memory) mounted onto a dedicated reader device can be considered, for example. In FIG. 17, the storage device 71 is shown as if it formed a single structure. However, the storage device 71 is usually formed by more than one of the above listed various types of devices (or medium), which are employed as necessary. That is, the storage device 71 is a general term referring to devices each having a function of storing data.

The actual CPU 70 is an electronic circuit including therein a RAM that allows a high-speed access thereto. Such a storage device included in the CPU 70 is described as being also included in the storage device 71 for convenience of the description. That is, it is described that data temporarily stored by the CPU 70 itself is also stored in the storage device 71. As shown in FIG. 17, the storage device 71 is used to store the program 710, a database 711, observation information 712, etc.

The operating part 72 is hardware operable by the user for giving an instruction to the information reception device 7. As the operation unit 72, various buttons, keys, a switch, a touch panel, a pointing device, a jog dial, etc. corresponds, for example.

The display part 73 is hardware having a function of displaying various kinds of information to the user to provide the information. As the display part 12, a lamp, an LED, a CRT, a liquid crystal display, a liquid crystal panel, etc. corresponds, for example.

The microphone 74 has a function which converts the surrounding sound to an electrical signal. The electrical signal acquired with the microphone 74 is stored as the observation information 791. Therefore, the microphone 74 has a function which acquires observation result as the observation information 791, based on observing the sound which arises in the surrounding environment.

According to the control signal from the CPU 70, by converting an electric signal to vibration, the speaker 75 vibrates air and has a function which reproduces a sound. Thereby, the information reception device 7 has a function as apparatus which reproduces music, a telephone call sound (talker's sound received), etc.

The communication part 76 provides a function in which the information reception device 7 performs data communications and a voice call, between external equipment (not shown).

As shown in FIG. 17, the information reception device 7 includes a MPU 77, a ROM 78, and a RAM 79.

The MPU 77 is an arithmetic unit with little power consumption at the time of processing compared with the CPU 70. The MPU 77 executes a program 780 stored in the ROM 78, and creates the observation information 791 based on the electrical signal input from the microphone 74. Additionally, the MPU 77 stores the observation information 791 in the RAM 79.

Although mentioned below for details, the MPU 77 has a function to analyze the observation information 791. And the MPU 77 also has a function to awake the CPU 70 (resumes an electric power supply), according to the analyzed result. During the second operational mode in the information reception device 7, electric power is supplied to the MPU 77 of the information reception device 7. Therefore, in the second operational mode, the MPU 77 can be operated.

The ROM 78 is nonvolatile read-only storage. The ROM 78 stores the program 780 executing by the MPU 77.

The RAM 79 is accessible at comparatively high speed. And the RAM 79 is the volatile storage which can also write data. The RAM 79 mainly used as a working area of the MPU 77.

Although the ROM 78 and the RAM 79 are illustrated as another different composition from the MPU 77 in FIG. 17, the MPU77 is possible to include such storage.

Figure 18:
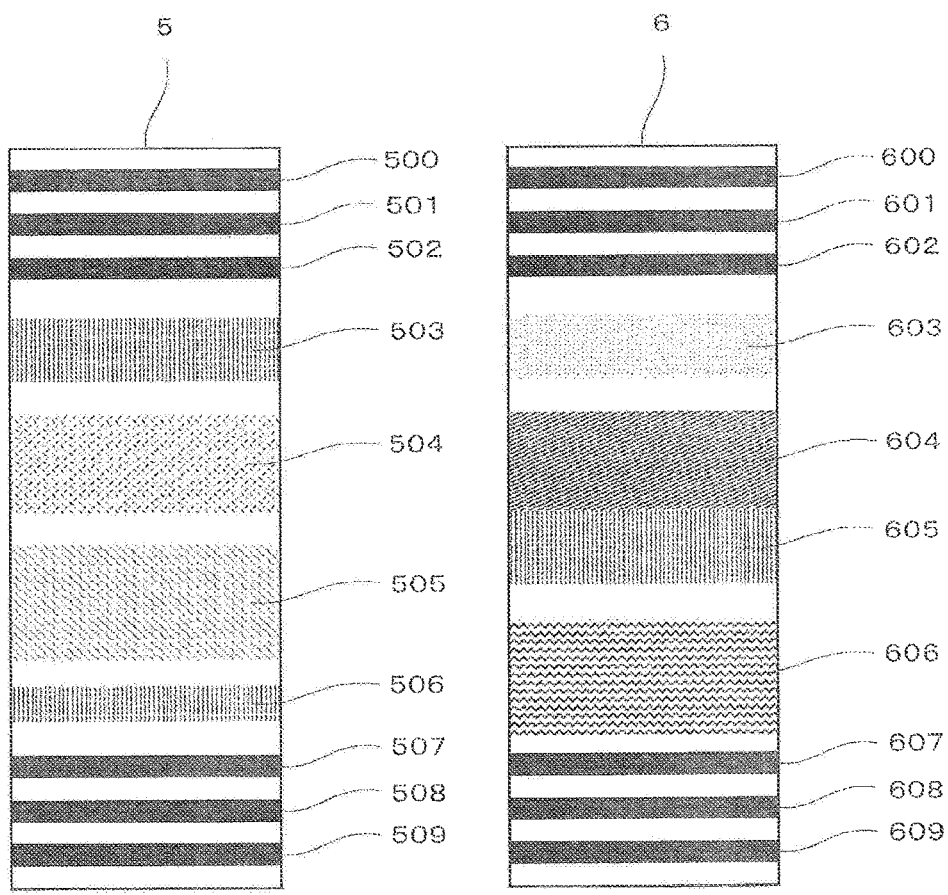
FIG. 18 shows a plurality of regions defined as a first operation target member and a second operation target member.

FIG. 18 shows a plurality of regions defined as the first operation target member 5 and the second operation target member 6.

The regions 500 to 509 are defined in the operation surface 50 of the first operation target member 5. The regions 600 to 609 are defined in the operation surface 60 of the second operation target member 6. Each region 500 to 509, and 600 to 609 are adjusted so that a respectively characteristic sound arises by being rubbed with the object.

In FIG. 18, about each region 500 to 509 and 600 to 609, the region which makes the same sound is illustrated by the same hatching.

That is, the regions 500, 501, 502, 507, 508, 509, 600, 601, 602, 607, 608, and 609 are regions which all make a common sound as a fricative. The regions 503, 506, and 605 are regions which all make a common sound as a fricative.

On the other hand, the regions 500, 503, 504, 505, 603, 604, and 606 are regions which make a different sound as a fricative each other.

Here, the case where the user rubs the operation surface 50 in the (−Y) direction from the (+Y) edge of the first operation target member 5 to the (−Y) edge by the user's finger, is assumed. In the following descriptions, such operation shall be called the "first user's operation".

In the first user's operation, while the finger is rubbing the inside of the regions 500 to 509, from the operation surface 50, the characteristic sound according to the region currently rubbed arises, respectively. In this case, the rubbing direction is the (−Y) direction. Therefore, the duration time of each characteristic sound is a value of quotient which divided width of Y axis direction of each region 500 to 509 by movement speed of the finger.

Since the user who is a person is moving the finger, the movement speed of the finger in the first user's operation is not strictly constant. However, unless the finger is stopped on the way intentionally, it can be considered that the movement speed of the finger is generally constant. Therefore, in general, it can be considered that the duration time of the sound which arises is dependent on the width of Y axis direction of each corresponding region.

That is, the regions 500 to 509 are defined as the operation surface 50, and the regions 500 to 509 are each adjusted so that a respectively characteristic sound may be made. Therefore, in the interval before being completed after the first user's operation is started, a plurality of characteristic sounds arise according to the arrangement order of the regions. And the duration time of each sound is decided in general by the width of Y axis direction of a corresponding region.

Therefore, a characteristic musical scale (melody) arises from the operation surface 50 by the first user's operation. That is, the first operation target member 5 is a member in which the operation surface 50 is formed, and the operation surface 50 is adjusted so that a characteristic musical scale arises when it is rubbed by an object. In the following descriptions, the musical scale which arises when the first user's operation is performed is called the "first musical scale".

Additionally, the case where the user rubs the operation surface 60 in the (−Y) direction from the (+Y) edge of the second operation target member 6 to the (−Y) edge by the user's finger, is assumed. It can say that it is the same as that of the first operation target member 5. In the following descriptions, such operation is referred to as the "second user's operation". And the musical scale which arises from the operation surface 60 by the second user's operation is referred to as the "second musical scale".

As shown in FIG. 18, all of the regions 500, 501, and 502 have the same width of Y axis direction. Therefore, in the first user's operation, from operation start till the finger comes out of the region 502, the same sound sounds three times in the same interval and the same duration. These sounds are partial musical scale which constitute a part of first musical scale in the first user's operation. In the following descriptions, the partial musical scale which arises in the regions 500, 501, and 502 by the execution of the first user's operation, is especially referred to as the "partial musical scale for recognition".

The regions 507, 508, and 509 are constituted as the same pattern as the regions 500, 501, and 502. Therefore, the partial musical scale for recognition arises also in the second half by the execution of the first user's operation. In other words, the first musical scale that arises by the first user's operation can be divided into the partial musical scale for recognition of start, a central partial musical scale, and the partial musical scale for recognition of end.

About the second operation target member 6, the regions 600, 601, and 602, and, the regions 607, 608, and 609 are constituted as the same pattern as the region 500, 501, and 502. Therefore, as well as the first musical scale, the second musical scale that arises by the second user's operation can be divided into the partial musical scale for recognition of start, a central partial musical scale, and the partial musical scale for recognition of end.

In the first operation target member 5 (the first musical scale) and the second operation target member 6 (the second musical scale), while the central partial musical scales differ each other, each partial musical scale for recognition is common to the example shown in FIG. 18.

Figures 19, 20:
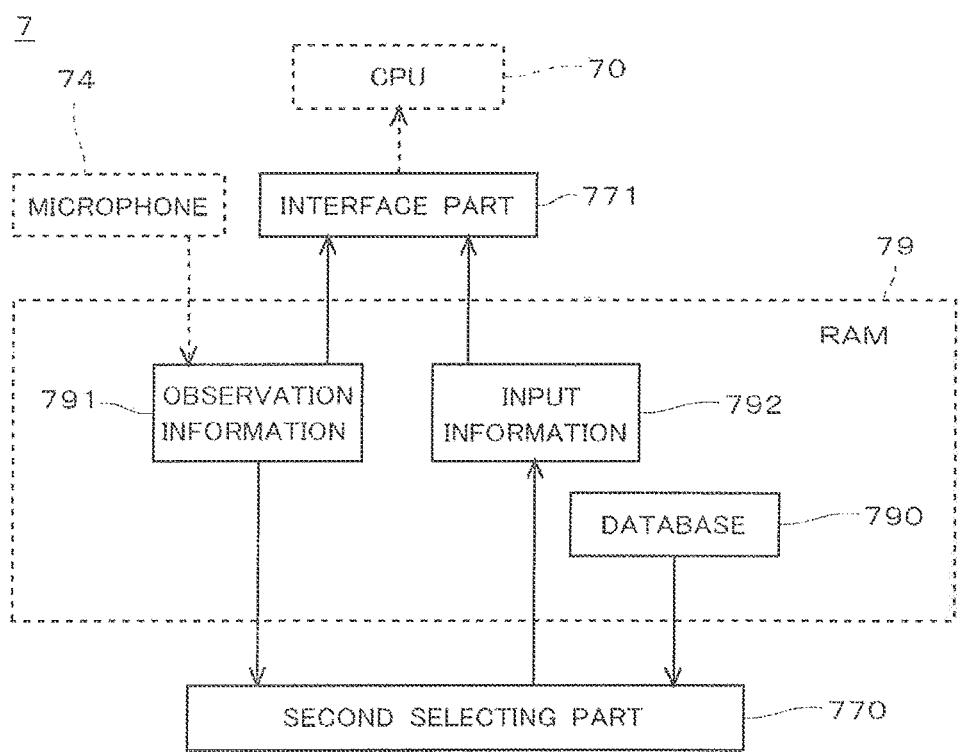
FIG. 19 shows the database which is stored in the RAM of information reception device which is included in the information reception system.
FIG. 20 shows functional blocks realized by the MPU of the information reception device which is included in the information reception system, together with a data flow.

FIG. 19 shows the database 790 which is stored in the RAM 79 of information reception device 7 which is included in the information reception system 4. The database 790 has a table structure by which one record is created about one candidate information (information which serves as a candidate of input information).

Here, the partial musical scale for recognition of only one is defined as common musical scale, and the existence of the partial musical scale for recognition in the observation information 791 is judged according to the frequency distribution of the partial musical scale for recognition. Therefore, in the example shown in FIG. 19, only one record is created in the database 790 and only one candidate information is stored therein. However, the record in the database 790 is not limited to one record.

The database 790 is information included in the program 780, and is information which is read from the ROM 78 by the MPU 77 and stored in the RAM 79.

FIG. 20 shows functional blocks realized by the MPU 77 of the information reception device 7 which is included in the information reception system 4, together with a data flow. The second selecting part 770 and the interface part 771 that are shown in FIG. 20 are functional blocks achieved by an operation of the MPU 77 in accordance with the program 780.

The second selecting part 770 judges whether or not the partial musical scale for recognition exists in the observation information 791 acquired. More specifically, the second selecting part 770 analyzes the sound included in the observation information 791, and acquires the frequency distribution of the sound analyzed. Next, the second selecting part 770 compares the frequency distribution of the sound acquired, to the frequency distribution of the partial musical scale for recognition stored in the database 790. When the frequency distribution of the sound approximates with the frequency distribution of the partial musical scale for recognition, the second selecting part 770 judges that the partial musical scale for recognition is included in the sound.

In the frequency distribution of the sound, it is not necessary to compare with the frequency distribution of the partial musical scale for recognition about all frequency bands. For example, as a result of repeating trial, only the frequency distribution in a frequency band with comparatively high reproducibility may be compared. It is not limited to an audible sound region.

When the second selecting part 770 judges that the partial musical scale for recognition exists, the selecting part 770 selects the candidate information which is related with the partial musical scale for recognition as the input information 114. The second selecting part 770 has a function which creates the input information 792 based on the candidate information selected.

The partial musical scale for recognition is a part of the first musical scale or the second musical scale, and is a comparatively short musical scale compared therewith. The partial musical scale for recognition is defined as a common musical scale between the first musical scale and the second musical scale. The second selecting part 770 creates the input information 792, when it searches only for the existence of such the partial musical scale for recognition from the sound recorded on the observation information 791 and the partial musical scale for recognition is contained. And the information which can be selected as the input information 792 is only a "transfer command", and, so to speak, the candidate information is fixed to one. That is, the second selecting part 770 realized in the MPU 77 provides an auxiliary and simple candidate information function preselection capability to the first selecting part 700 mentioned below.

The interface part 771 refers to the input information 792, and has a function to judge whether or not the input information 792 includes the transfer command. The interface part 771 transmits the observation information 791 to the CPU 70, when the transfer command is included in the input information 792. When the information reception device 7 is operating by the second operational mode at this time, the interface part 771 transmits the observation information 791 to the CPU 70, after switching operational mode to the first operational mode.

That is, the interface part 771 has a function to switch the operational mode of the information reception device 7 from the second operational mode to the first operational mode, when the information reception device 7 is operating by the second operational mode and the transfer command is chosen as the input information 792.

In the second operational mode, the electric power supply is severed as for the CPU 70. Therefore, during the second operational mode, the CPU 70 is in the condition which cannot process the observation information 791. However, the interface part 771 switches the second operational mode to the first operational mode, before transmission of the observation information 791. Thereby, the electric power supply to the CPU 70 is started. Therefore, the CPU 70 becomes the condition which can process the observation information 791.

In the still other preferred embodiment, the observation information 791 transmitted towards the CPU 70 is stored by the CPU 70 as the observation information 712 at the storage device 71. In this preferred embodiment, the observation information 712 is described as the same information as the observation information 791. Although, the observation information 712 may be manipulated to different information if needed.

Figures 21, 22:
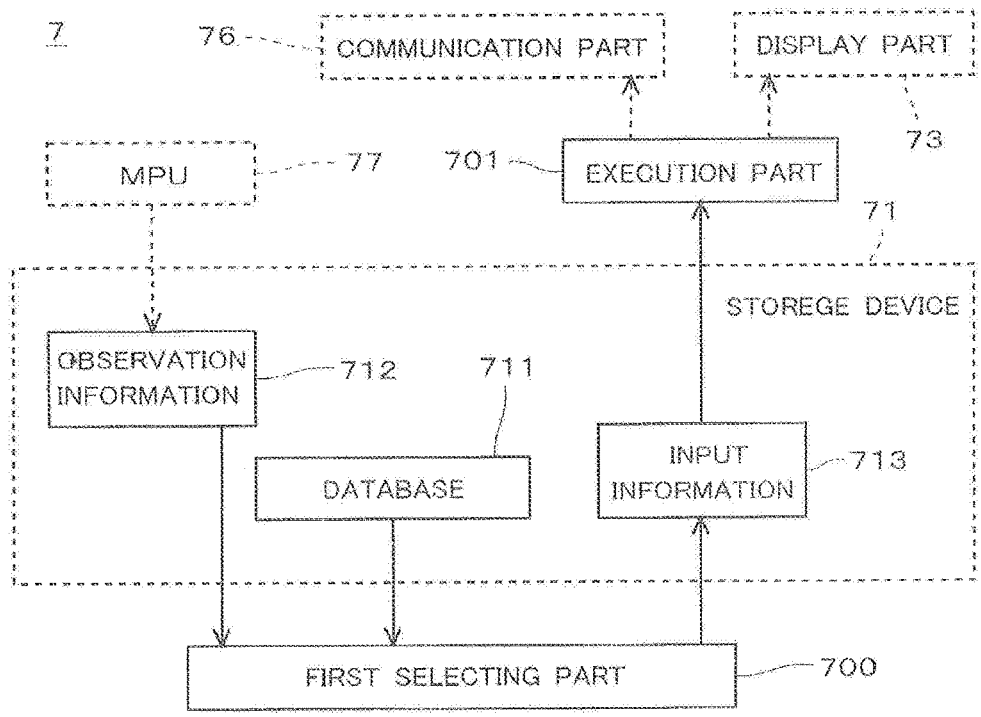
FIG. 21 shows the database stored by a storage of the information reception device which is included in the information reception system.
FIG. 22 shows functional blocks realized by the CPU of the information reception device which is included in the information reception system, together with a data flow.

FIG. 21 shows the database 711 stored by the storage 71 of the information reception device 7 which is included in the information reception system 4. The database 711 has a table structure by which one record is created about one candidate information (information which serves as a candidate of input information).

In the example shown in FIG. 21, only two pieces of musical scales (the first musical scale and the second musical scale) are defined. Based on the frequency distributions of the musical scale, the existences of the musical scale in the observation information 712 are judged. Therefore, in the example shown in FIG. 21, only two records are created in the database 711, and the candidate information is stored in each of it (the two pieces of candidate information are stored in the database 711). However, the record in the database 711 is not limited to two records.

FIG. 22 shows functional blocks realized by the CPU 70 of the information reception device 7 which is included in the information reception system 4, together with a data flow. The first selecting part 700 and an execution part 701 which are shown in FIG. 22 are functional blocks achieved by an operation of the CPU 70 in accordance with the program 710.

The first selecting part 700 judges the existence of the musical scale in the observation information 712 acquired with the microphone 74 and transmitted by the MPU 77. In details, the first selecting part 700 analyzes the sound contained (recorded) in the observation information 712, and acquires the frequency distribution of the sound of them. And when the acquired frequency distribution of the sound is compared with the frequency distribution of the musical scale stored in the database 711 and the frequency distribution of the sound approximates with the frequency distribution of musical scale, it judges that the musical scale is contained in the sound.

In the frequency distribution of the sound, it is not necessary to compare with the frequency distribution of the musical scale about all frequency bands. For example, as a result of repeating trial, only the frequency distribution in a frequency band with comparatively high reproducibility may be compared. It is not limited to an audible sound region.

The first selecting part 700 searches the database 711 according to the existence of the musical scale. And the selecting part 700 selects the candidate information used as the input information 713 from a plurality of candidate information, and creates the input information 713.

The execution part 701 has a function to execute a command, with reference to the input information 713. When the input information 713 is a "transmitting mail command", the execution part 701 controls the communication part 76, and makes an E-mail transmit. At this time, the execution part 701 controls the display part 73, and prohibits lighting of the screen of the display part 73. When the input information 713 is a "lighting command", the execution part 701 controls the display part 73, and makes the display part 73 turn on.

The above is the description of the structure and functions of the information reception system 4. Next, operation of the information reception device 7 is described.

Figure 23:
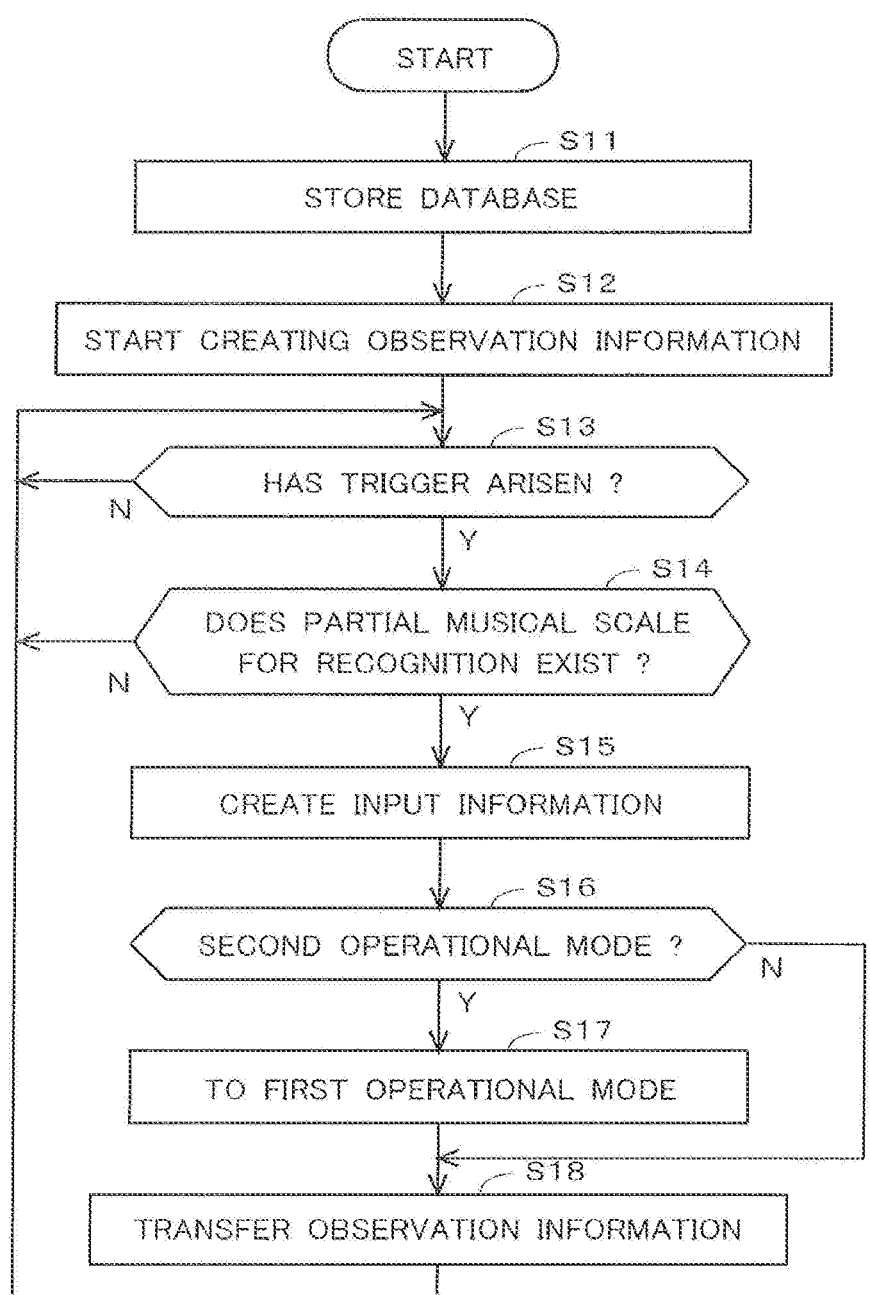
FIG. 23 is a flow chart showing operation of the MPU of the information reception device which is included in the information reception system.

FIG. 23 is a flow chart showing operation of the MPU 77 of the information reception device 7 which is included in the information reception system 4. When a power source is switched on, the MPU 77 starts the processing shown in FIG. 23, after performing predetermined initial setting (not shown). Electric power is supplied to the MPU 77 as far as the power supply of the information reception device 7 is switched on.

When the processing shown in FIG. 23 is started, the MPU 77 loads the database 790 from the program 780, and stores it to the RAM 79 (Step S1). Next, based on the signal from the microphone 74, the MPU 77 starts creation for the observation information 791 (Step S12), and becomes in the state of monitoring the arising of a trigger (Step S13). Hereinafter, this state is referred to as a "trigger monitoring state".

The MPU 77 judges that the trigger occurred, when the sound which is equal to or more than a threshold value [dB] is detected in a predetermined frequency band, as a result of analyzing the observation information 791. However, the trigger is not limited to this. For example, a timing which comes by a predetermined cycle can be considered as the trigger. The arising of the partial musical scale for recognition mentioned below can be considered as the trigger.

In the trigger monitoring state, when the trigger has arisen (Yes in Step S13), the second selecting part 770 acquires the frequency distribution of the portion which is regarded as the portion (e.g., it can detect from the elapsed time from the trigger) which can be equivalent to the partial musical scale for recognition, from the observed sound (the surrounding environmental sound), based on the observation information 791. And the frequency distribution of the portion of the environmental sound is compared with the frequency distribution of the partial musical scale for recognition stored in the database 790, and it is judged whether the partial musical scale for recognition exists or not in the observation information 791 (Step S14).

Here, when the frequency distribution similar to the frequency distribution of the portion of the environmental sound used as the search key exists in the item of the "partial musical scale" of the database 790, the second selecting part 770 regards that the partial musical scale for recognition exists in the observation information 791. In this case, the second selecting part 770 gives "Yes" as the judgement result, in Step S14. On the other hand, when the frequency distribution similar to the frequency distribution of the portion of the environmental sound used as the search key not existed in the item of the "partial musical scale" of the database 790, the second selecting part 770 regards that the partial musical scale for recognition did not exist in the observation information 791. In this case, the second selecting part 770 gives "No" as the judgement result, in Step S14.

When the judgement result is "No" in Step S14, the MPU 77 regards that the sound which arises when the operation surface 50 (or the operation surface 60) is rubbed by the object is not contained in the portion of the environmental sound containing the sound detected as the trigger. In this case, the MPU 77 judges that operation by the user has not been carried out, and returns to the trigger monitoring state. Thus, when the MPU 77 judges that operation (the first user's operation or the second user's operation) to the operation surface 50 (or the operation surface 60) has not been carried out, the information reception device 7 does not create the input information 792.

Therefore, the observation information 791 is not transmitted towards the CPU 70. Thus, in the second operational mode, the power consumption of the CPU 70 can be reduced. On the other hand, also in the first operational mode, useless processing is not forced to the CPU 70.

Like the plurality of preferred embodiments described above, the frequency distribution of the partial musical scale for recognition is defined comparatively strictly. Thus, a possibility that it may be judged that the partial musical scale for recognition exists based on the sounds other than the sound which arises in the operation surface 50 (or the operation surface 60) is low compared with a conventional technology. Therefore, a possibility that the information reception device 7 may create the wrong input information 792 is low compared with a conventional technology, based on the sounds other than the sound which arises when the object contacted to the operation surface 50 (or the operation surface 60).

In Step S14, when the judgement result is "Yes", the second selecting part 770 selects the candidate information (here transfer command) related with the frequency distribution of the partial musical scale for recognition, and creates the input information 792 based on the candidate information selected (Step S15).

Thus, the execution of Step S15 means that the candidate information shown in the input information 792 had been received by the information reception device 7 as the information inputted by the user.

When the input information 792 is created, the interface part 771 judges whether the operational mode of the information reception device 7 is the second operational mode (Step S16).

When the judgement is "Yes" in Step S16, the interface part 771 switches the operational mode of the information reception device 7 to the first operational mode (Step S17). That is, the interface part 771 resumes the electric power supply to the CPU 70. Thereby, the state of the CPU 70 is changed into the state where the observation information 791 can be processed.

When the judgement is "No" in Step S16 (when the operational mode is the first operational mode), or when processing of Step S17 has been completed, the interface part 771 executes the input information 792 (transfer command), and transfers the observation information 791 to the CPU 70 (Step S18). After transmission of the observation information 791, the MPU 77 returns to the trigger monitoring state.

Thus, when the partial musical scale for recognition exists in the observation information 791, by selecting and executing the transfer command related with the partial musical scale for recognition, the MPU 77 transfers the observation information 791 to the CPU 70.

The above is the operation of the MPU 77 in the information reception device 7. Next, operation of the CPU 70 in the information reception device 7 is explained.

Figure 24:
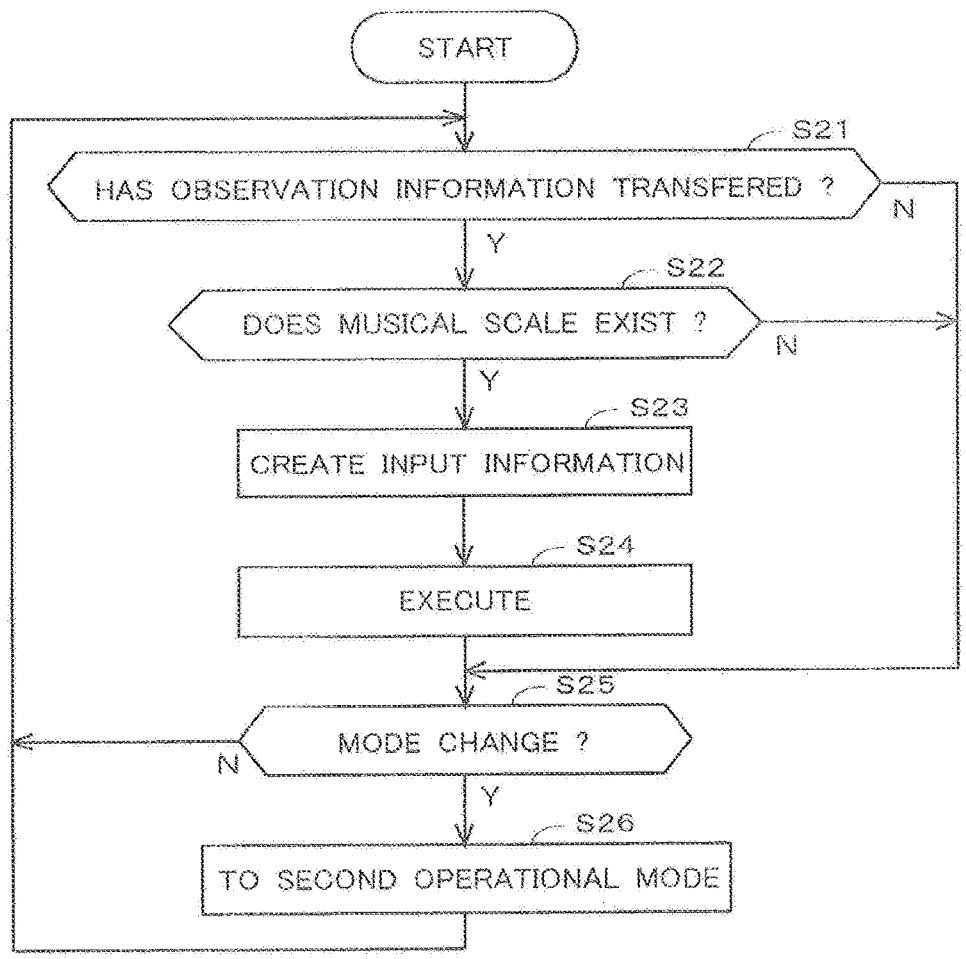
FIG. 24 is a flow chart showing operation of the CPU of the information reception device which is included in the information reception system.

FIG. 24 is a flow chart showing operation of the CPU 70 in the information reception device 7 which is included in the information reception system 4.

When the information reception device 7 is the second operational mode, the electric power supply to the CPU 70 is being severed. Therefore, the processing shown in FIG. 24 is processing which is not performed when the operational mode of the information reception device 7 is the second operational mode. By the time each process shown in FIG. 24 is started, the database 711 shall already be stored by the storage device 71. When supply of the power supply to the information reception device 7 is started, the information reception device 7 shall start operation by the first operational mode.

When the processing shown in FIG. 24 is started, the state of the CPU 70 is the state of monitoring about whether the observation information 791 has been transmitted from the MPU 77 (Step S21), and whether the operational mode should be changed to the second operational mode (Step S25). Hereinafter, this state is only referred to as a "monitoring state".

In the monitoring state, when the observation information 791 is transmitted from the MPU 77, the CPU 70 judges "Yes" in Step S21, and creates the observation information 712 based on the transmitted observation information 791. The created observation information 712 is stored in the storage 71.

Next, the first selecting part 700 performs a search of the database 711 for selecting candidate information by using the frequency distribution of the sound contained in the observation information 712 as the search key. Thereby, the first selecting part 700 judges whether the musical scale (the first musical scale or the second musical scale) defined in the database 711 exists in the observation information 712 (Step S22).

When the judgement is "No" in Step S22, the first selecting part 700 regards that the operation by the user is not carried out. In this case, the first selecting part 700 does not create the input information 713, and returns to the monitoring state.

On the other hand, when the judgement is "Yes" in Step S22, the first selecting part 700 selects the candidate information related with the frequency distribution of the detected musical scale from the database 711 as the input information 713. And the first selecting part 700 creates the input information 713 based on the selected candidate information (Step S23).

By performing Step S23, it means that the candidate information included in the input information 713 has been received by the information reception device 7 as the input information by the user. Therefore, after Step S23 is performed, processing according to the input information 713 is performed by the execution part 701 (Step S24). By performing Step S24, when processing according to the input information 713 has been executed, the CPU 70 returns to the monitoring state again.

In the monitoring state, when the situation which should change to the second operational mode arises, the CPU 70 decides "Yes" in Step S25, and switches the operational mode of the information reception device 7 into the second operational mode (Step S26).

Specifically, the CPU 70 stops the displaying in the display part 73, and switches off the backlight, and stops the electric power supply of the CPU 70. Thereby, the information reception device 7 shifts to the state where power consumption is being reduced. As already described, in the second operational mode, the electric power supply to the MPU 77 is continued, and each process (Step S11 to S17) is in the state which can be performed.

When the user instructs shift to the second operational mode directly to the information reception device 7, or when operation by the user to the information reception device 7 is not carried out for a definite period of time, are assumed to be the situations which should shift to the second operational mode from the first operational mode. However, it is not limited to such a situation.

Next, an information input method in which the user inputs desired information as the input information 713 using the information reception device 7 is described. In the following descriptions, the example to which the user transmits the E-mail which informs return to a family using the information reception device 7 is described.

Before the operation by the user, the database 711 and the database 790 shall be already stored. The information reception device 7 has already started creation of the observation information 791 (Step S12), and the MPU 77 shall be already the trigger monitoring state.

The user rubs the operation surface 50 of the first operation target member 5 stuck on the information reception device 7 by the finger from the (+Y) edge to the (−Y) edge at the (−Y) direction. That is, the user performs the first user's operation.

Thus, when the user's finger contacts to the operation surface 50 and rubs it, a characteristic fricative arises from the operation surface 50. This fricative arises as the first musical scale by forming the regions 500 to 509 in the operation surface 50.

The sound of the environment of the circumference containing this first musical scale is converted to an electrical signal by the microphone 74. Based on the electrical signal acquired like this, the observation information 791 is created by the MPU 77. The MPU 77 detects the trigger (judging "Yes" in Step S13), analyzing the fricative (the first musical scale). And the MPU 77 judges whether the partial musical scale for recognition is contained in the observation information 791 by referring to the database 790 (Step S14).

The observation information 791 created here contains the first musical scale that arose by having rubbed the operation surface 50. Therefore, the frequency distribution of the environmental sound contains a portion similar to the frequency distribution of the partial musical scale for recognition. Therefore, in this case, the second selecting part 770 judges that the partial musical scale for recognition exists (Yes in Step S14). And the second selecting part 770 selects the candidate information related with the frequency distribution of the partial musical scale for recognition detected, and creates the input information 792 (Step S15).

The processing to here is the processing which can be also performed while the information reception device 7 is operating by the second operational mode. That is, the user can perform the first user's operation, without being conscious of the operational mode of the information reception device 7.

When the input information 792 is created by the second selecting part 770, the interface part 771 checks whether the operational mode of the information reception device 7 is the second operational mode. When it is the second operational mode, the interface part 771 performs Step S17 and switches the operational mode to the first operational mode.

According to Step S16, and S17, henceforth, it is in the state where the CPU 70 started. Therefore, it is in the state in which processing by the CPU 70 is possible.

When the information reception device 7 is in the state where it is operating by the first operational mode, the interface part 771 turns the observation information 791 to the CPU 70, and transmits. Thereby, the CPU 70 receives the observation information 791, and stores in the storage 71 as the observation information 712.

Next, the first selecting part 700 analyzes the observation information 712, and judges whether the musical scale registered in the database 711 is contained in the observation information 712. The observation information 712 (observation information 791) created here contains the first musical scale. Therefore, the first selecting part 700 selects the candidate information (transmitting mail command) related with the first musical scale, and creates the input information 713 (Step S23).

The transmitting mail command selected here is considered a command that transmits a fixed message (a message of purport telling of "returning to home") to a fixing address (family). The execution part 701 executes the transmitting mail command.

That is, the communication part 76 is controlled to transmit the E-mail of which the content is the fixed message preliminarily registered, to the fixing address preliminarily registered. Thereby, the communication part 76 transmits the E-mail which tells "returning to home", to the family. During this process, the execution part 701 does not make the display part 73 turn on.

In the second operational mode, the display part 73 of the information reception device 7 is in the non-display state. Even if the first user's operation is carried out in this state, the MPU 77 only awakes the CPU 70 and does not make the display part 73 turn on. The CPU 70 (the execution part 701) does not make the display part 73 turn on, too.

Therefore, the information reception device 7 can transmit the E-mail, maintaining the display part 73 in a non-display state. That is, power consumption can be reduced by transmitting the E-mail without letting the display part 73 which is hardware with comparatively large power consumption turn on.

A touch panel has to display GUI to let user select a command. Therefore, it is difficult to operate the touch panel during a non-display state of the display part 73. When an E-mail is suddenly transmitted by first touch of the screen of the non-display state, erroneous transmission occurs frequently. On the other hand, it may be possible to allocate such a function to the key or button which are hardware. In that case, the information reception device 7 will be provided with the key or button of which a function is restrictive. Therefore, the flexibility of the operating part 72 is deteriorated.

However, the information reception system 4 includes the first operation target member 5 as the seal member which can be chosen arbitrarily and be laid out, by the user. When the user operates the first operation target member 5, the information reception system 4 realizes such a function (one-shot transmitting function). Therefore, when the user does not need such a function, the user should not attach the first operation target member 5. The user who needs such a function can attach the first operation target member 5 on a favorite position, so the flexibility of the operating part 72 is not deteriorated. Additionally, the operation is the first user's operation, and the first user's operation needs to rub with predetermined distance in predetermined direction. Therefore, it is able to say that a risk of erroneous operation is low, even if the display part 73 is the non-display state.

As for the second musical scale that arises by rubbing the operation surface 60 of the second operation target member 6, in the database 711, the frequency distribution of the second musical scale is related with the "lighting command". Therefore, when the user performs the second user's operation, from the operation surface 60, the second musical scale (includes the partial musical scale for recognition) arises, and the "lighting command" is executed in Step S24.

That is, although a detailed description is omitted, the user can light the display part 73 in the "non-display" state by performing the second user's operation, while the information reception device 7 is operating by the second operational mode. By this, the user can see the displayed information by the display part 73.

As described above, the information reception system 4 which receives input information 713 according to the user's operation includes: the first operation target member 5 on which the operation surface 50 which is adjusted to produce the characteristic first musical scale when the operation surface 50 is rubbed by the object is formed; and the information reception device 7. The information reception device 7 includes: the storage 71 which stores the database 711 in which the transmitting mail command (the first candidate information) which serves as the candidate of the input information 713 is related with the first musical scale; the microphone 74 which acquires observation information 791 according to observation of sound arising in surrounding environment; and the selecting part 700. The selecting part 700 decides whether or not the first musical scale exists in the observation information 791 acquired. In addition, when the first musical scale exists, the selecting part 700 selects the transmitting mail command which is related with the first musical scale, as the input information 713. By using the operation surface 50 adjusted intentionally, the accuracy of the judgement about existence of the first musical scale in the observed observation information 791 improves.

Moreover, in the conventional technology disclosed in the Japanese Unexamined Patent Application Publication No. 2006-252037, the specified operation sound arising by the user is used only for judging the existence of the user's operation. Thus, the technology disclosed in the above document has a problem which is lacking in a viewpoint in which the user enjoys the arisen sound. In the information reception system 4, the first musical scale may be a phrase to which the user is used to listening (e.g., a part of music). Thereby, the user can enjoy the user's operation itself.

The first operation target member 5 is attachable to the information reception device 7, in the detachable state. Thereby, the first operation target member 5 is exchangeable with the user's intention. Therefore, the user can customize constitution according to the user's favor.

The adherend 51 which is different from the operation surface 50 is formed in the first operation target member 5. The first operation target member 5 can stick to the information reception device 7, and can remove the adherend 51 in the sticking state on the information reception device 7. Thereby, the first operation target member 5 can easily exchange.

The information reception device 7 includes the second operation target member 6 on which the operation surface 60 is formed. The operation surface 60 is adjusted to produce the characteristic second musical scale different from the first musical scale when the operation surface 60 is rubbed by the object. The storage 71 stores the lighting command (the second candidate information) which serves as the candidate of the input information 713. The lighting command is related with the second musical scale. The first selecting part 700 judges whether or not the second musical scale exists in the observation information 791 acquired by the microphone 74. And when the first selecting part 700 judges that the second musical scale exists, the first selecting part 700 selects the lighting command related with the second musical scale as the input information 713. Thus, by defining a plurality of musical scales, the candidate information used as the input information 713 can be selected from the plurality of candidate information. Therefore, flexibility improves.

Moreover, the first musical scale includes the characteristic partial musical scale. The RAM 79 stores the transmitting command (the third candidate information) which serves as the candidate of the input information 792. The transmitting command is related with the partial musical scale. The second selecting part 770 judges whether or not the partial musical scale exists in the observation information which is acquired by the microphone 74. And when the second selecting part 770 judges that the partial musical scale exists, the second selecting part 770 selects the transmitting command which is related with the partial musical scale as the input information 792. Thereby, what is called a header and footer may be defined, and flexibility further improves.

As mentioned above, the information reception device 7 includes the first selecting part 700 and the second selecting part 770. The information reception device 7 includes the interface part 771 which switches the operational mode of the information reception device between the first operational mode and the second operational mode. The first operational mode is the operational mode in which the electric power is supplied to the first selecting part 700, or which is a usual power consumption state. The second operational mode is the operational mode in which the electric power is not supplied to the first selecting part 700, or which is a low power consumption state. When the transmitting command (the third candidate information) is selected as the input information 792, the interface part 771 switches the operational mode of the information reception device 7 from the second operational mode to the first operational mode. Thereby, power consumption can be reduced, without inhibiting the user's operation.

It is preferable to allow the user to choose what kind of candidate information is related with what kind of musical scale. For example, the information reception device 7 activates the exclusive application software which creates (or updates) the database 711 when the first operation target member 5 is stuck thereon. In this time, user performs the first user's operation, and the user may specify the candidate information which is related with the arising sound by the first user's operation. By constituting in this way, the information reception system 4 is able to become the system depending on the preference of the user. Additionally, the calibration in consideration of the sticking position of the first operation target member 5, or in consideration of the user's individuality, etc. is enabled, too. Therefore, the detection accuracy improves.

As mentioned above, although described about the preferred embodiments of the invention, the present invention is not limited to the above-mentioned embodiments, and various deformation is possible for it.

For example, the Steps shown in the preferred embodiment are mere examples. The Steps are not limited to the order and the contents described above. That is, if the same effect can be acquired, the order or the contents may be modified as appropriate.

The functional blocks (e.g., the selecting part 100, the first selecting part 700, and the second selecting part 770) shown in the above preferred embodiments are achieved in forms of software by the operation of the CPU (or the MPU) in accordance with the program. However, a portion or an entire portion of those functional blocks may be formed by a dedicated logic circuit in the form of hardware.

For example, the actual vibration which arises in the surrounding environment when the object contacts the operation surface, is not limited to the aerial vibration which is propagated through the air. For example, the vibration which arises in the operation surface 190 and is mainly propagated through the inside of the information reception device (as an object), is also assumed. Thus, the composition which observes the actual vibration which arises in the surrounding environment is not limited to the microphones 15, 16, 17, and 18 which observe aerial vibration as a sound wave. Therefore, it may be a vibration sensor which detects vibration which is propagated through the inside of the information reception device. Compared with the sound wave transmitted in the inside of the air, the vibration which is propagated through the inside of device is easy to come under the influence by the structure (known) peculiar to device. Therefore, by using the vibration sensor, the accuracy which recognizes observed real vibration as the index vibration, may be improved.

The information which is acquired as the supplementary information 113 is not limited to what is described by the above mentioned embodiments. For example, the supplementary information may be the operation frequency (within predetermined time), the operating speed, and the operating strength etc.

In the information reception devices 1, 2, 3, and 7, the case in which the direction to rub is only linear, is described. However, the contact loci on the operation surface 190, 290, 50, and 60 (also the first operation surface 390, and the second operation surface 391) may be a circle, a rectangle, or the shape of letter, etc.

Operation surface may be adjusted so that the different characteristic index vibration according to the position in operation surface may be produced. It may be adjusted so that the index vibration may change according to a position, as if gradation was formed. When constituted in this way, an operation position can be specified by the detected index vibration. Therefore, the operation position can be specified, without providing multiple observation sensors (for example, microphone).

The index vibration which arises by the operation surface, changes according to the state of the operation surface. Therefore, the sensors (for example, a temperature sensor, an air pressure sensor, a humidity sensor, etc.) which detect the surrounding environment may be provided. When the sensors are provided, the state of the operation surface can be judged by the observation by the sensors. By constituting in this way, the calibration can be performed based on the judgement. The state of the operation surface also changes by the abrasion states thereof. Therefore, based on the frequency of usage, the passed years, etc., an abrasion state may be presumed. By constituting in this way, the calibration can be performed based on the presumed abrasion state.

The regions 500 to 509 are arranged in the first operation target member 5. Thereby, although the partial musical scale for recognition is the same, the musical scale which arises when the first operation target member 5 is rubbed in the (−Y) direction, differs from the musical scale which arises when the first operation target member 5 is rubbed in the (+Y) direction. Therefore, a respectively different command may be related with these different musical scales. The musical scale which arises when the first operation target member 5 is rubbed in the (−Y) direction may be related with the volume increase command, and the musical scale which arises when the first operation target member 5 is rubbed in the (+Y) direction may be related with the volume decrease command.

The first operation target member 5 may include a portion formed of a transparent material which transmits a light. Thereby, even if the first operation target member 5 is stuck on the screen of the display part 73, the screen is not interrupted, for example. That is, flexibility of the place on which the first operation target member 5 is stuck improves.

The first operation target member 5 does not need to be directly stuck on the information reception device 7. For example, it may be stuck on the housing member (a case, a lid member, etc.) which stores the information reception device 7.

Moreover, the first operation target member 5 is not limited to the seal member. For example, the first operation target member 5 may constitute the housing member (a case, a lid member, etc.) which stores the information reception device 7. By such composition, the first operation target member 5 can also be attachable and detachable.

The first musical scale that arises from the first operation target member 5 (operation surface 50) may be related with various information. For example, the command into which a plurality of commands are combined, and the command which specifies desired URL and activates a browser may be assumed. By constituting in this way, the first operation target member 5 (operation surface 50) can treat like a shortcut key to input the command which is customized by the user.

While the invention has been shown and described in detail, the foregoing description is in all aspects illustrative and not restrictive. It is therefore understood that numerous modifications and variations can be devised without departing from the scope of the invention. The scope of the present invention is shown by claims.

What is claimed is:

1. An information reception system receiving input information according to a user's operation, comprising:
    an operation surface adjusted to produce a characteristic index vibration by an object contact;
    a storage configured to store candidate information which serves as a candidate of the input information, the candidate information is related with the index vibration;
    an observation sensor configured to acquire observation information according to observation of actual vibration arising in surrounding environment; and
    circuitry configured to:
        judge whether or not the index vibration exists in the observation information acquired, and
        select, when the circuitry judges that the index vibration exists, the candidate information related with the index vibration as the input information.

2. The information reception system according to claim 1, wherein
    the index vibration is a vibration arising when the object is contacting and moving on the operation surface.

3. The information reception system according to claim 1, wherein
    the candidate information including a plurality of the candidate information related with each other different supplementary information,
    the circuitry is further configured to:
        acquire, when the circuitry judges that the index vibration exists, the supplementary information according to observation information;
        select the candidate information according to the supplementary information acquired, as the input information.

4. The information reception system according to claim 3, wherein
    the supplementary information including information about a position of a user's operation to the operation surface.

5. The information reception system according to claim 4, comprising:
    a plurality of the observation sensors differ in positional relationship to the operation surface each other, wherein
    the circuitry is further configured to acquire the information about the position of the user's operation to the operation surface as the supplementary information according to comparing each observation information acquired by the plurality of the observation sensors.

6. The information reception system according to claim 1, comprising:
    a plurality of the observation sensors differ in positional relationship to the operation surface each other, wherein
    the circuitry is further configured to judge whether or not the index vibration exists according to each of observation information acquired by the plurality of the observation sensors.

7. The information reception system according to claim 1, wherein
    the index vibration includes:
        a first index vibration arising when the object is moved in first direction; and
        a second index vibration different from the first index vibration arising when the object is moved in second direction different from the first direction,
    the storage stores:
        first candidate information corresponding to the first index vibration, and
        second candidate information corresponding to the second index vibration, the second candidate information is different from the first candidate information,
    the circuitry is further configured to:
        select the first candidate information when the first index information exists; and
        select the second candidate information when the second index information exists.

8. The information reception system according to claim 1, wherein
    the operation surface includes:
        a first operation surface adjusted to produce a characteristic third index vibration by the object contact; and
        a second operation surface adjusted to produce a characteristic fourth index vibration by the object contact,
    the storage stores:
        third candidate information corresponding to the third index vibration, and
        fourth candidate information corresponding to the fourth index vibration, the fourth candidate information is different from the third candidate information,
    the circuitry is further configured to:
        select the third candidate information when the third index information exists; and
        select the fourth candidate information when the fourth index information exists.

9. The information reception system according to claim 1, wherein
the operation surface is adjusted to produce a different characteristic index vibration according to a position in the operation surface.

10. The information reception system according to claim 1, wherein
the observation sensor observes sound as the actual vibration, the sound is arising in the surrounding environment.

11. An information reception system receiving input information according to a user's operation, comprising:
a first operation target member on which an operation surface is formed, the operation surface adjusted to produce a characteristic first melody when the operation surface is rubbed by an object; and
an information reception device; wherein
the information reception device, comprising:
a storage configured to store first candidate information which serves as a candidate of the input information, the first candidate information is related with the first melody;
an observation sensor configured to acquire observation information according to observation of sound arising in surrounding environment; and
circuitry configured to:
judge whether or not the first melody exists in the observation information acquired, and
select, when the circuitry judges that the first melody exists, the first candidate information related with the first melody as the input information.

12. The information reception system according to claim 11, wherein
the first operation target member is attachable to the information reception device, in the detachable state.

13. The information reception system according to claim 12, wherein
the first operation target member including:
an adherend which is different from the operation surface,
wherein
the first operation target member sticks to the information reception device, and
the first operation target member removes from the information reception device, by removing the adherend in a sticking state on the information reception device.

14. The information reception system according to claim 11, wherein
the first operation target member including a portion formed of a transparent material which transmits a light.

15. The information reception system according to claim 11, wherein
the first operation target member forms a housing member which houses the information reception device.

16. The information reception system according to claim 11, further comprising:
a second operation target member on which an operation surface is formed, the operation surface adjusted to produce a characteristic second melody different from the first melody when the operation surface is rubbed by an object; wherein
the storage is further configured to store second candidate information which serves as a candidate of the input information, the second candidate information is related with the second melody,
the circuitry is further configured to:
judge whether or not the second melody exists in the observation information acquired, and
select, when the circuitry judges that the second melody exists, the second candidate information related with the second melody as the input information.

17. The information reception system according to claim 1, wherein
the first melody including a characteristic partial melody,
the storage is further configured to store third candidate information which serves as a candidate of the input information, the third candidate information is related with the partial melody,
the circuitry is further configured to:
judge whether or not the partial melody exists in the observation information acquired, and
select, when the circuitry judges that the partial melody exists, the third candidate information related with the partial melody as the input information.

18. The information reception system according to claim 17, wherein
the circuitry comprising:
a first selecting circuitry configured to;
judge whether or not the first melody exists in the observation information acquired, and
select, when the circuitry judges that the first melody exists, the first candidate information related with the first melody as the input information,
a second selecting circuitry configured to;
judge whether or not the partial melody exists in the observation information acquired, and
select, when the circuitry judges that the partial melody exists, the third candidate information related with the partial melody as the input information, and
a switching circuitry configured to switch an operational mode of the information reception device between first operational mode and second operational mode, the first operational mode is the operational mode in which the electric power is supplied to the first selecting circuitry, or which is a usual power consumption state, and the second operational mode is the operational mode in which the electric power is not supplied to the first selecting circuitry, or which is a low power consumption state, wherein
the switching circuitry further configured to:
switch, when the third candidate information selected as the input information, the operational mode of the information reception device from the second operational mode to the first operational mode.

19. A non-volatile computer-readable storage medium storing computer-readable instructions that, when executed by a computer including circuitry, cause the computer to perform a method comprising:
storing, by the circuitry, candidate information which serves as a candidate of input information, the candidate information is related with index vibration;
acquiring, by an observation sensor, observation information according to observation of actual vibration arising in surrounding environment;
judging, by the circuitry, whether or not the index vibration exists in the observation information acquired, and
selecting, by the circuitry, when the circuitry judges that the index vibration exists, the candidate information related with the index vibration as the input information.

20. A non-volatile computer-readable storage medium storing computer-readable instructions that, when executed by a computer including circuitry, cause the computer to perform a method comprising:
- storing, by the circuitry, first candidate information which serves as a candidate of input information, the first candidate information is related with a first melody;
- acquiring, by an observation sensor, observation information according to observation of sound arising in surrounding environment;
- judging, by the circuitry, whether or not the first melody exists in the observation information acquired, and
- selecting, by the circuitry, when the circuitry judges that the first melody exists, the first candidate information related with the first melody as the input information.

21. An information input method for inputting input information using an information reception system including circuitry, the information input method comprising:
- storing, by the circuitry, candidate information which serves as a candidate of the input information, the candidate information is related with index vibration;
- acquiring, by an observation sensor, observation information according to observation of actual vibration arising in surrounding environment;
- judging, by the circuitry, whether or not the index vibration exists in the observation information acquired, and
- selecting, by the circuitry, when the circuitry judges that the index vibration exists, the candidate information related with the index vibration as the input information.

22. An information input method for inputting input information using an information reception system including circuitry, the information input method comprising:
- storing, by the circuitry, first candidate information which serves as a candidate of the input information, the first candidate information is related with a first melody;
- acquiring, by an observation sensor, observation information according to observation of sound arising in surrounding environment;
- judging, by the circuitry, whether or not the first melody exists in the observation information acquired, and
- selecting, by the circuitry, when the circuitry judges that the first melody exists, the first candidate information related with the first melody as the input information.

* * * * *